US008515341B2

(12) United States Patent
Yuda et al.

(10) Patent No.: US 8,515,341 B2
(45) Date of Patent: Aug. 20, 2013

(54) RELAY STATION APPARATUS AND RELAY METHOD

(75) Inventors: Yasuaki Yuda, Kanagawa (JP); Seigo Nakao, Kanagawa (JP); Ayako Horiuchi, Kanagawa (JP); Daichi Imamura, Kanagawa (JP); Kenichi Miyoshi, Kanagawa (JP); Megumi Ichikawa, legal representative, Kanagawa (JP); Hiroaki Morino, Tokyo (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 13/260,971

(22) PCT Filed: Feb. 12, 2010

(86) PCT No.: PCT/JP2010/000889
§ 371 (c)(1),
(2), (4) Date: Sep. 29, 2011

(87) PCT Pub. No.: WO2010/113382
PCT Pub. Date: Oct. 7, 2010

(65) Prior Publication Data
US 2012/0108164 A1   May 3, 2012

(30) Foreign Application Priority Data

Mar. 31, 2009  (JP) ................................ 2009-086971

(51) Int. Cl.
*H04B 7/15* (2006.01)
(52) U.S. Cl.
USPC ........................... 455/11.1; 455/13.1; 455/16

(58) Field of Classification Search
USPC ................ 455/3.02, 427, 428, 430, 431, 7–9, 455/11.1, 12.1, 13.1, 13.2, 14–17; 340/425.1; 370/226, 293, 246, 274, 279, 315, 316, 492, 370/501
See application file for complete search history.

(56) References Cited

U.S. PATENT DOCUMENTS 3,823,401 A * 7/1974 Berg et al. ..................... 370/280
5,619,550 A * 4/1997 Averbuch et al. .......... 379/29.08

(Continued)

FOREIGN PATENT DOCUMENTS

| WO | 2006/123751 A1 | 11/2006 |
| WO | 2007/097449 A1 | 8/2007 |
| WO | 2007/102344 A1 | 9/2007 |

OTHER PUBLICATIONS

Bo Gui. et al., "Routing Strategies in Broadband Multihop Cooperative Networks", 41st Annual Conference on Information Sciences and Systems, Apr. 14, 2007, pp. 661-666.

(Continued)

*Primary Examiner* — Dominic E Rego
(74) *Attorney, Agent, or Firm* — Pearne & Gordon LLP

(57) ABSTRACT

To prevent relaying wrong information by determining whether a radio signal is to be relayed in accordance with a function of error detection in the radio signal. A relay station apparatus according to an aspect of the invention is a relay station apparatus which relays a radio signal between a transmission station and a reception station, including: a receiver which is configured to receive the radio signal from the transmission station; and a relay determination section which is configured, in accordance with a function of error detection in the radio signal received by the receiver, to determine whether the signal is to be relayed or not, based on a first channel quality indicating a channel quality from the transmission station to the relay station apparatus.

8 Claims, 12 Drawing Sheets

(56) References Cited

U.S. PATENT DOCUMENTS

| | | | | |
|---|---|---|---|---|
| 6,144,464 A | * | 11/2000 | Rupp et al. | 358/442 |
| 6,941,502 B2 | * | 9/2005 | Rushton | 714/755 |
| 7,225,253 B2 | * | 5/2007 | Ofir et al. | 709/224 |
| 8,065,586 B2 | * | 11/2011 | Miyoshi et al. | 714/752 |
| 8,228,917 B2 | * | 7/2012 | Vayanos et al. | 370/394 |
| 2008/0198788 A1 | * | 8/2008 | Lim et al. | 370/315 |
| 2008/0305740 A1 | * | 12/2008 | Horiuchi et al. | 455/11.1 |
| 2009/0036051 A1 | | 2/2009 | Horiuchi et al. | |
| 2009/0083605 A1 | | 3/2009 | Miyoshi et al. | |
| 2009/0092072 A1 | * | 4/2009 | Imamura et al. | 370/315 |
| 2009/0109892 A1 | * | 4/2009 | Oyman et al. | 370/315 |
| 2010/0279603 A1 | | 11/2010 | Horiuchi et al. | |

OTHER PUBLICATIONS

Ayako Iwata, et al., "Kaisen Hinshitsu ni Ojite Chukeikyoku o Sentaku suru Multihop System", The Transactions of the Institute of Electronics, Information and Communication Engineers B, Oct. 1, 2007, J90-B (10), pp. 995-1006.

Iwata Ayako, et al., "Selection Method of Relay Station according to Reception Quality for Multihop System", The Technical Report of the Proceeding of the Institute of Electronics, Information and Communication Engineers, vol. 105, No. 356 RCS2005-105, pp. 121-126, Oct. 13, 2005.

International Search Report for PCT/JP2010/000889 dated Mar. 16, 2010.

* cited by examiner

FIG.12
(a) 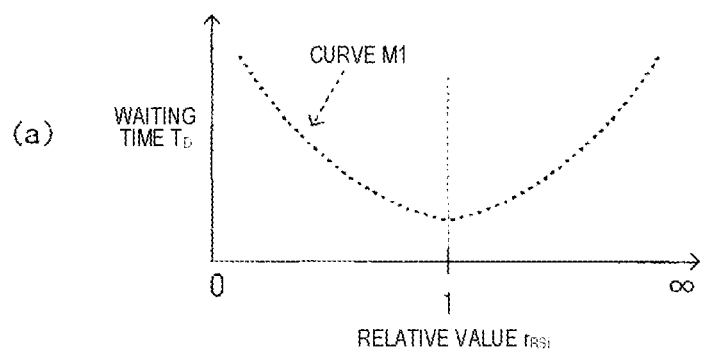
(b) 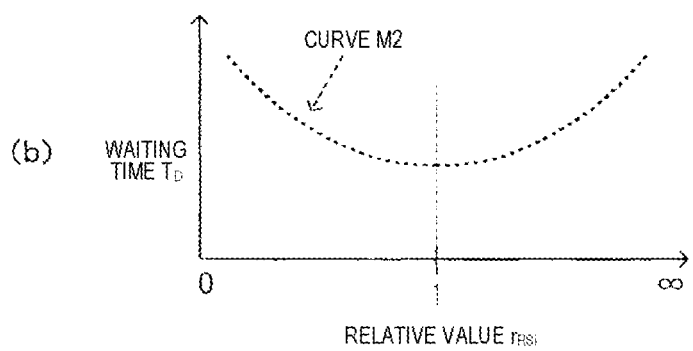
(c) 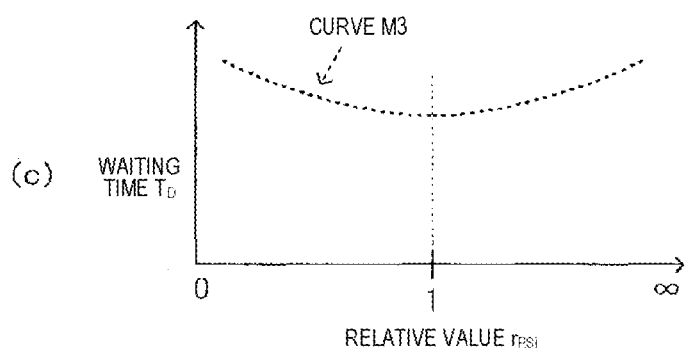

RELAY STATION APPARATUS AND RELAY METHOD

TECHNICAL FIELD

The present invention relates to a relay station apparatus and a relay method for relaying a radio signal from a transmission station to a reception station.

BACKGROUND ART

In the field of wireless communication, recently, the technique of relaying a radio signal has attracted attention.

The relaying technique is expected to exert effects of expansion of the communication area and increase of the communication capacity. A relay station (RS: Relay Station) is installed to cover a place where a radio wave transmitted from a base station (BS: Base Station) does not reach. Then, the relay station relays the radio signal between the BS and a mobile station (MS: Mobile Station), with the result that the base station can communicate with the mobile station via the relay station. Therefore, it is possible to expand the communication area. The transmission power of the mobile station largely affects the power consumption of a battery. When the relaying technique is applied to an uplink which is a channel from the mobile station to the base station, an effect that the transmission power of the mobile station is suppressed to a low level is remarkably obtained. In the relaying technique, when the communication area covered by the RS is set narrow, a frequency can be repeatedly used. Consequently, there is an effect that the frequency use efficiency of the entire system is improved and the communication capacity can be increased.

Hereafter, a base station is referred to as a BS, a relay station (relay station apparatus) is referred to as an RS, and a mobile station is referred to as an MS. In the case where a plurality of stations exist, they are expressed as BSi (i=1, 2, 3 ... , n−1, n; n is a natural number), RSi (i=1, 2, 3 ... , n−1, n; n is a natural number), and MSi (i=1, 2, 3 ... , n−1, n; n is a natural number), respectively.

As a relaying method in an RS, there are various methods. When attention is focused on the signal processing in the RS, for example, there are a method (decode and forward relay) in which a signal received by the RS is demodulated and decoded to reproduce and transmit (relay) transmission data, and a method (amplify and forward relay) in which power amplification is performed on an RF signal received by the RS and the power-amplified RF signal is transmitted (relayed). When attention is focused on the number of RSs which perform relaying, there are a method (multi-hop) in which relaying is sequentially performed by using a plurality of RSs, and a method (single hop) in which relaying is performed by using a single RS.

Referring to FIG. 17, a multi-hop in a channel (uplink) from an MS to a BS will be described. FIG. 17 shows a multi-hop in an uplink. In FIG. 17, in the uplink, RS1, RS2, RS3, RSn−1, and RSn relay a signal transmitted from an MS, to a BS. The arrows in the figure indicate relay paths from the MS to the BS.

As indicated by the arrows (thick channels) shown in FIG. 17, RS3 first relays the signal transmitted from the MS. Next, the relay station RSn−1 transmits (relays) the signal relayed by RS3, to the BS. As a method of controlling a relay path from the MS to the BS, for example, there are a method in which RSs control the relay paths in an autonomous decentralized manner, respectively, and a method in which the relay paths are controlled in a centralized manner by using a path controlling apparatus.

In the multi-hop environment which has been described with reference to FIG. 17, the technique called flooding has been studied.

Flooding in the multi-hop environment will be described with reference to FIG. 18. FIG. 18 is a diagram showing flooding in an uplink. In FIG. 18, an environment where a signal transmitted from the MS cannot directly reach the BS, and signal relaying by the RS is necessary is set. Furthermore, RS1, RS2, RS3, and RSn transmit (relay) the signal transmitted from the MS. Moreover, it is assumed that the relay paths indicated by the arrows in the figure from the MS to the BS have not been determined.

Referring to FIG. 18, after the MS transmits the signal, the RSs receive the transmitted signal of the MS and perform a receiving process because the relay path of the transmitted signal has not been determined. Next, each of the RSs determines whether it has received the transmitted signal of the MS or not. As a method in which each RS determines whether it has received the transmitted signal of the MS or not, for example, there are a method in which it is determined depending on the reception level whether the reception has been performed or not, and a method in which, in the case of decode and forward relay, determination is performed by using a function of error detection.

Then, all of RSs which determine that the reception has been performed perform relaying. In the figure, a circle and "RECEPTION OK" are shown at the tip end of an arrow indicating the signal of the determination that the corresponding RS has performed the reception. Moreover, a cross and "RECEPTION NG" are shown at the tip end of an arrow indicating the signal of the determination that the corresponding RS has failed the reception.

In FIG. 18, as a result of the receiving process which has been performed in each of RS1, RS2, and RS3 on the signal transmitted by the MS, RS1 and RS2 determine that the reception has been performed, and RS3 determines that reception cannot be performed. Therefore, RS1 and RS2 relay the transmitted signal of the MS.

In FIG. 18, next, it is determined that the signal relayed by RS2 has been transmitted to RSn and RSn has received the signal. Then, RSn relays the signal transmitted from RS2, to the BS. In this way, the transmitted signal of the MS reaches the BS while repeating the relaying in the RSs.

In the flooding in the multi-hop environment shown in FIG. 18, for example, a method of preventing a signal that is once received by an RS from being twice relayed in order not to cause a signal loop, and a method of avoiding signal collision in order to prevent a plurality of RSs to perform transmission at the same timing are studied. Moreover, application to broadcast transmission in the multi-hop environment, a sensor network, and the like is widely studied.

Similarly, application of flooding to point-to-point communication is also studied.

Non-patent Literature 1 discloses a relay method in which flooding is applied to point-to-point communication. In the method, specifically, among a plurality of RSs which determine that a signal transmitted from an MS has been received, the RS having the highest channel quality from the RS to a BS relays the signal transmitted from the MS.

Here, the relay method disclosed in Non-patent Literature 1 above will be described with reference to FIGS. 19 and 20. FIG. 19 is a diagram showing the manner of relaying in an uplink. FIG. 20 is a diagram showing a relaying operation shown in FIG. 19.

FIGS. 19 and 20 assume an environment where the signal transmitted from the MS cannot directly reach the BS, and therefore signal relaying by RSs is necessary. It is assumed that the relay path from the MS to the BS has not been determined. In FIGS. 19 and 20, moreover, it is assumed that the downlink signal from the BS can be received by the MS and all the RSs. This is because limitation of the transmission power in the BS is smaller than that in the MS and hence the downlink signal can be transmitted with a large power. In FIGS. 19 and 20, furthermore, it is assumed that the channel quality from an RS to the BS is higher in the sequence of RS3, RS2, and RS1. The channel quality from an RS to the BS is estimated by each RS from the downlink signal from the BS. In FIGS. 19 and 20, moreover, it is assumed that the channel quality from an RS to the BS is higher in the sequence of RS3, RS2, and RS1. This is because it is considered that the channel quality from an RS to the BS is higher as the distance between the RS and the BS is shorter. The arrows in FIGS. 19 and 20 indicate the transmitted signal of the MS. Numbers (1) to (4) are affixed to the arrows in accordance with the relay destinations, respectively.

With reference to FIGS. 19 and 20, first, the MS transmits the signal, and thereafter the RSs perform the process of receiving the signal transmitted from the MS. Then, each of the RSs determines whether it has received the signal transmitted from the MS or not. As the method by which the RS determines that the reception has been performed, there are a method in which it is determined depending on the reception level whether the reception has been performed or not, and a method in which, in the case of decode and forward relay, determination is performed by using a function of error detection.

In FIGS. 19 and 20, next, among RS1 and RS2 which determine that reception has been performed, the RS2 having the highest channel quality from the RS to the BS is selected as an RS which is to relay the signal transmitted from the MS, to the BS. Then, RS2 transmits the signal transmitted from the MS, to the BS.

As described above, an RS which is estimated that the channel quality from the RS to the BS is highest is selected as an RS which is to relay the signal transmitted from the MS, to the BS, and therefore an RS which is closer to the BS is selected. In the multi-hop environment, therefore, the number of relays can be reduced. In the single-hop environment, the channel quality from an RS to the BS is high, and hence the reception performance in the BS becomes excellent. In the single-hop environment, in the case where adaptive modulation is applied in the signal transmitted from an RS, the frequency efficiency can be improved.

In the flooding, in order not to cause a signal loop, as described above, the configuration where an RS does not relay twice a signal that is once received is studied. In order to prevent an RS from relaying twice a signal that is once received, the RS must notify the other RSs that relaying is performed by the RS oneself, by any method. With respect to the channel quality from the RS to the BS, for example, a waiting time corresponding to the relay priority is previously set in the time from the timing when the RS receives the signal to that when the RS relays it.

With reference to FIG. 21, therefore, a method of notifying RSs other than the relaying RS that the relaying RS relays a signal will be described. FIG. 21 is a diagram showing relationships between the waiting time (ordinate) corresponding to the relay priority and the channel quality (abscissa) from an RS to the BS.

In the method, as shown in FIG. 21, in the time from the timing when an RS receives the signal to the timing when the RS relays it, an RS having a higher relay priority earlier starts relaying with respect to the waiting time corresponding to the relay priority. In each of the RSs, during the waiting time of the RS oneself, in the case where a relayed signal from another RS is not detected, the RS oneself performs relaying.

In the case of the past example shown in FIGS. 19 and 20, the channel quality from an RS to the BS is higher in the sequence of RS2 and RS1 except RS3 which has failed to receive the transmitted signal from the MS. With reference to FIG. 21, it is seen that the waiting time of RS2 in which the channel quality from the RS to the BS is higher than RS1 is shorter than that of RS1. Therefore, RS2 relays the transmitted signal from the MS more preferentially than RS1. Since the transmitted signal from the MS is already relayed from RS2, RS1 does not relay the transmitted signal from the MS.

CITATION LIST

Non-Patent Literature

Non-patent Literature 1: IWATA Ayako et al., "Selection Method of Relay Station according to Reception Quality for Multihop System", The Technical Report of The Proceeding of The Institute of Electronics, Information and Communication Engineers, Vol. 105, No. 356 RCS2005-105, pp. 121-126, Oct. 13, 2005.

SUMMARY OF INVENTION

Technical Problem

In the above-described art in the related art, when a signal containing erroneous information exists in a signal which is determined to be received by an RS, however, there is a possibility that the RS may relay wrong information.

It is an object of the invention to provide a relay station apparatus and relay method in which wrong information can be prevented from being relayed.

Solution to Problem

The relay station apparatus according to an aspect of the invention is a relay station apparatus which relays a radio signal between a transmission station and a reception station, including: a receiver which is configured to receive the radio signal from the transmission station; and a relay determination section which is configured, in accordance with a function of error detection in the radio signal received by the receiver, to determine whether the signal is to be relayed or not, based on a first channel quality indicating a channel quality from the transmission station to the relay station apparatus.

According to the configuration, the relay station apparatus in which the possibility of relaying erroneous information is low can be selected in accordance with the function of error detection in the signal to be relayed by the relay station apparatus.

In the relay station apparatus, the relay determination section is configured, in accordance with the function of error detection in the radio signal received by the receiver, to determine whether the signal is to be relayed or not, based on the first channel quality and a second channel quality indicating a channel quality from the relay station apparatus to the reception station.

According to the configuration, the relay station apparatus in which the possibility of relaying erroneous information is low can be selected in accordance with the function of error detection in the signal to be relayed by the relay station apparatus.

The relay station apparatus includes a quality determination section which is configured, when an undetected error probability in the radio signal received by the receiver is high, to determine whether the first channel quality satisfies a required quality or not, and the relay determination section is configured, if the quality determination section determines that the first channel quality satisfies the required quality, to determine whether the radio signal is to be relayed or not, based on the second channel quality.

According to the configuration, the relay station apparatus in which the possibility of relaying erroneous information is low can be selected in accordance with the function of error detection in the signal to be relayed by the relay station apparatus.

The relay station apparatus further includes an error detector which is configured to detect an error of the radio signal received by the receiver, and the relay determination section is configured, when the undetected error probability in the radio signal received by the receiver is low, to determine whether the radio signal is to be relayed or not, based on a result of the detection by the error detector and the first channel quality.

According to the configuration, the relay station apparatus in which the possibility of relaying erroneous information is low can be selected in accordance with the function of error detection in the signal to be relayed by the relay station apparatus.

In the relay station apparatus, the relay determination section is configured, in accordance with the function of error detection in the radio signal received by the receiver, to determine whether the signal is to be relayed or not, based on a relative value between the first channel quality and the second channel quality.

According to the configuration, the relay station apparatus in which the possibility of relaying erroneous information is low can be selected in accordance with the function of error detection in the signal to be relayed by the relay station apparatus.

In the relay station apparatus, the relay determination section is configured, in accordance with the function of error detection in the radio signal received by the receiver, to determine whether the signal is to be relayed or not, based on the relative value and an absolute value between the first channel quality and the second channel quality.

According to the configuration, the relay station apparatus in which the possibility of relaying erroneous information is low can be selected in accordance with the function of error detection in the signal to be relayed by the relay station apparatus.

A relay method according to an aspect of the invention is a relay method in a relay station apparatus which relays a radio signal between a transmission station and a reception station, the relay method including: receiving the radio signal from the transmission station; and determining, in accordance with a function of error detection in the received radio signal, whether the signal is to be relayed or not, based on a first channel quality indicating a channel quality from the transmission station to the relay station.

Advantageous Effects of Invention

According to the relay station apparatus and the relay method according to the aspects of the invention, in accordance with the function of error detection in a radio signal, it is determined whether the radio signal is to be relayed or not, whereby wrong information can be prevented from being relayed.

BRIEF DESCRIPTION OF DRAWINGS

In FIG. 12, (a) to (c) are graphs showing relationships between the relative value r_RSi and the waiting time in the second embodiment.

MODE FOR CARRYING OUT INVENTION

Hereinafter, an aspect of the invention will be described with reference to the drawings.

One of features of a relay station apparatus (relay station) according to the aspect of the invention is that, in accordance with the undetected error probability in a radio signal transmitted from a mobile station, the relay station apparatus determines whether the radio signal transmitted from the MS is to be relayed or not, based on a channel quality from the mobile station to the relay station apparatus and a channel quality from the relay station apparatus to a base station.

Hereafter, the relay station apparatus (relay station) is referred to as an RS, the mobile station is referred to as an MS, and the base station is referred to as a BS. In the case where a plurality of relay stations (relay stations) exist, they are expressed as RSi (i=1, 2, 3 ..., n−1, n; n is a natural number). In the aspect of the invention, a relaying process in an uplink which is a channel from the MS to the BS will be exemplarily described. In the aspect of the invention, moreover, a case of a single hop in which an RS relays a signal only once will be exemplarily described as a relaying mode of the RS.

Figure 1:
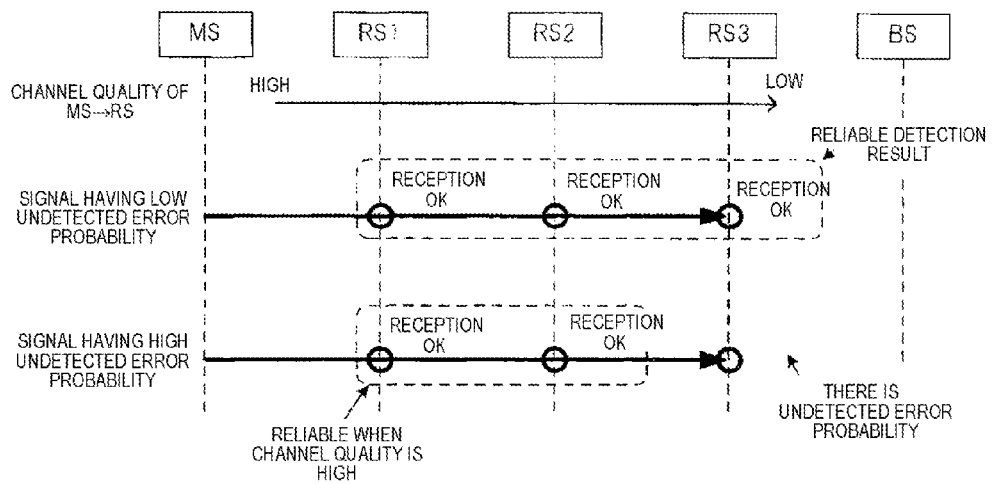
FIG. 1 is a diagram illustrating the reason for paying attention to the undetected error probability in a radio signal according to aspect of the invention.

The reason for, in the aspect of the invention, paying attention to the undetected error probability in a radio signal which is relayed by the RS, and which is transmitted from the MS will be described with reference to FIG. 1. FIG. 1 is a diagram showing the manner of relaying radio signals of different missing probabilities of errors, in the aspect of the invention.

In the case where the MS transmits a radio signal to the RS, the radio signal which is received by the RS from the MS is affected by a propagation path fluctuation between the MS and the RS, and noises, and an error occurs in the radio signal. With respect to the signal error, usually, error correction coding is used. However, there is a case where an error cannot be corrected by an error correction code. Therefore, there is a function of error detection for detecting whether an error occurs in the radio signal which is received by the RS from the MS. For example, there are a CRC (Cyclic Redundancy Check), a parity check, and the like. When focusing attention on the function of error detection in the radio signal, the undetected error probability that the RS detects that an error does not exist despite that an error occurs in the radio signal which is received by the RS from the MS is different.

Here, a case where the undetected error probability in the radio signal is low, and a case where the undetected error probability is high will be considered.

In other words, the case where the undetected error probability in the radio signal is low means a case where the reliability of the function of error detection in the radio signal is high. In the above-described CRC, for example, a CRC having a long bit number, such as a 24-bit CRC or a 16-bit CRC corresponds to the case where the undetected error probability is low. In such a low case, the result of the error detection in the RS is reliable irrespective of the reception SNR indicating the channel quality.

In other words, by contrast, the case where the undetected error probability is high means a case where the reliability of the function of error detection in the radio signal is low. For example, a CRC having a short bit number (such as a 4-bit CRC) and a 1-bit parity check correspond to the case. Furthermore, a case where the radio signal has no function of error detection corresponds to the case. In such a case where the undetected error probability is high, there is a possibility that error missing occurs, and therefore the result of the error detection in the RS has a low reliability.

Referring to FIG. 1, the case where the undetected error probability in the radio signal is low in relaying in an uplink, and that where the undetected error probability in the radio signal is high will be described. In FIG. 1, RS1, RS2, and RS3 relay the radio signal transmitted from the MS, to the BS. In FIG. 1, it is assumed that the channel quality from the RS to the BS is in the sequence of RS1>RS2>RS3.

First, a case where a radio signal having a low undetected error probability is transmitted from the MS will be described. The RSs perform error detection on the radio signal received from the MS. As a result, RS1, RS2, and RS3 determine that an error is not detected in the radio signal received from the MS and the signal has been correctly received. Since the undetected error probability in the signal is low, the determination result can be reliable. Therefore, it is considered that RS3 that is an RS having the highest channel quality from the RS to the BS among the RSs which determine that the radio signal has been received from the MS will relay the signal received from the MS.

Next, a case where a radio signal having a high undetected error probability is transmitted from the MS will be described.

The RSs perform error detection on the radio signal received from the MS. As a result, RS1, RS2, and RS3 determine that an error is not detected in the radio signal received from the MS and the signal has been correctly received. Since the undetected error probability in the signal is high, however, there is a possibility that error missing occurs in the determination result.

Therefore, attention is focused on an error detecting code which is the function of error detection. It is usually known that, in the case where bit errors which exceed the error detection capability are caused, error missing occurs. In a situation where bit errors are reduced, i.e., the channel quality is sufficiently high, even in a signal having a high undetected error probability, therefore, it is considered that the determination result of the error detection can be reliable. Consequently, although there is a possibility that error missing occurs in RS3 in which the channel quality with respect to the MS is not so high, the result of the error detection can be reliable in RS1 and RS2 in which the channel quality with respect to the MS is sufficiently high. Therefore, a relaying RS will be selected from RS1 and RS2 in which the channel quality with respect to the MS is sufficiently high. In FIG. 1, accordingly, RS2 in which the channel quality from the RS to the BS is highest performs relaying.

Here, the relaying RS in the aspect is a relay station apparatus (relay station) which relays the radio signal received from the MS, to the BS.

Figure 2:
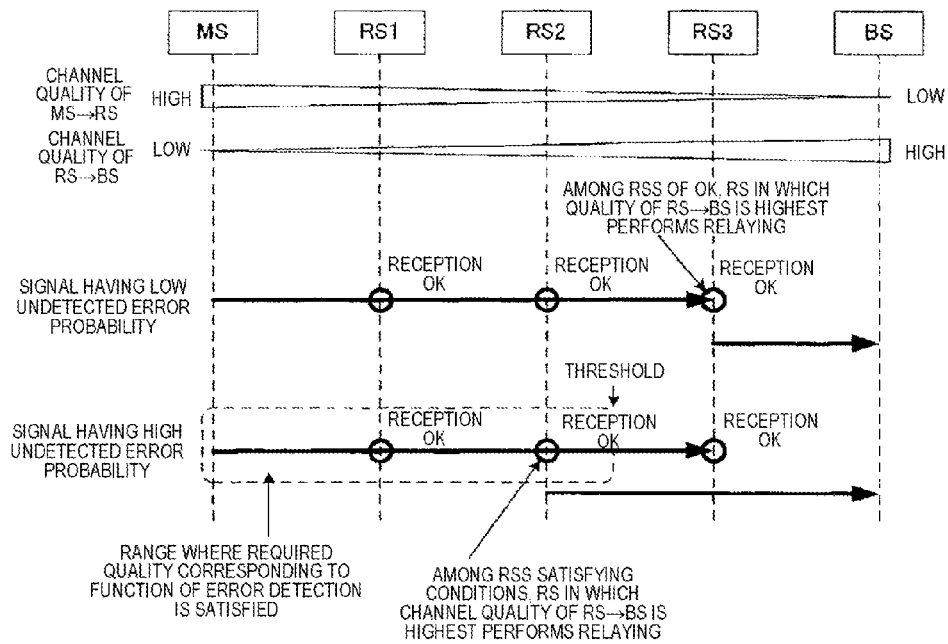
FIG. 2 is a diagram showing the manner of selecting a relaying RS in FIG. 1.
Figure 3:
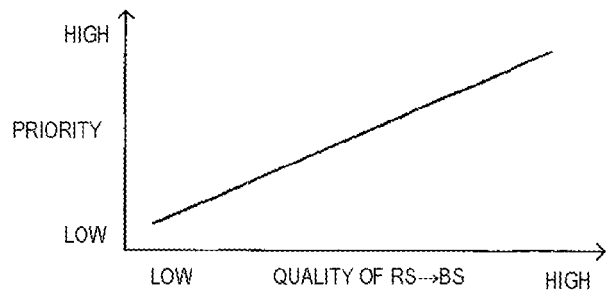
FIG. 3 is a graph showing relationships between the priority of the relaying RS and the channel quality from the RS to a BS.

Referring to FIGS. 1 to 3, next, the features will be described while separately considering (1) a case where the undetected error probability which is the property of the radio signal received from the MS is low in the relay station apparatus according to the aspect of the invention, and (2) a case where the undetected error probability is high. FIG. 2 is a diagram showing the manner of selecting the relaying RS in FIG. 1. Moreover, FIG. 3 is a graph showing relationships between the priority of the relaying RS and the channel quality from the RS to the BS.

(Relaying of Radio Signal Having Low Undetected Error Probability)

The radio signal which is received by an RS from the MS has a property that the undetected error probability is low, and hence it is estimated that the result of the error detection in each RS has a high reliability. Therefore, the relaying RS is determined from all RSs in which it is determined that the respective RSs have received the radio signal from the MS without error.

Referring to FIG. 2, in the case where the undetected error probability in the radio signal received from the MS is low, relay stations in which it is determined that the corresponding RS has received without error (in FIG. 2, indicated as RECEPTION OK) are RS1, RS2, and RS3. From the relationships shown in FIG. 3 between the priority of the relaying and the channel quality from the RS to the BS, the priorities of the relaying in the RSs are determined as RS3, RS2, and RS1 in descending order. As shown in FIG. 2, in the case where a signal having a low undetected error probability is to be relayed in the aspect of the invention, therefore, the relaying RS is RS3.

As described above, in the case where an RS is to relay a signal having a low undetected error probability, it is estimated that the reliability of the result of error detection in the relay station is high. Therefore, each RS determines whether the received signal from the MS is to be relayed or not, based on the channel quality from the RS to the BS.

In the case where each RS is to relay a radio signal having a high undetected error probability (in other words, the reliability of the result of error detection in the relay station is low), however, the RS determines the received signal from the MS is to be relayed or not, based on the channel quality from the MS to the RS in addition to the channel quality from the RS to the BS. In a similar manner as the case of relaying of a radio signal having a low undetected error probability, a case where a radio signal having a high undetected error probability is relayed in the relay station apparatus of the aspect of the invention will be described with reference to FIGS. 1 to 3.

(Relaying of Radio Signal Having High Undetected Error Probability)

The radio signal which is received from the MS has a property that the undetected error probability is high, and hence it is estimated that the result of the error detection in each RS has a low reliability. Therefore, all RSs which satisfy a predetermined quality corresponding to the function of error detection in an RS are determined from all RSs in which it is determined that the respective RSs have received the radio signal from the MS without error.

Here, a specific method of determining RSs which satisfy a predetermined quality corresponding to the function of error detection will be described. An RS performs error detection on the radio signal received from the MS, and estimates the channel quality Q_(MS→RSi) from the MS to the RS, based on the radio signal. Hereinafter, the underline indicated by "_" in the aspect shows that characters (for example, MS→RSi) following the underline are subscripts of the character (for example, Q) which is immediately before the underline.

Moreover, the RS sets a threshold Th_RS of the predetermined reception quality corresponding to the function of error detection in the radio signal received from the MS. If the channel quality Q_(MS→RSi) from the MS to the RS is higher than the threshold Th_RS (in other words, the relationship satisfying (Exp. 1) below), the RS determines that the radio signal received from the MS satisfies the required quality corresponding to the function of error detection in the radio signal. Then, the RS determines whether the signal transmitted from the MS is to be relayed or not, based on the detection result of the error detection and the quality determination result indicated by (Exp. 1).

[Exp. 1]

$$Q_{MS \to RSi} > Th_{RS} \quad \text{(Exp. 1)}$$

Referring to FIG. 2, in the case where the undetected error probability in the radio signal received from the MS is high, RSs in which it is determined that the corresponding RS has received without error (in FIG. 2, indicated as RECEPTION OK) are RS1, RS2, and RS3. Moreover, RSs which are determined by the determination expression indicated by (Exp. 1) that the predetermined quality corresponding to the function of error detection in an RS are RS1 and RS2. Then, the priority of the relaying in the RSs is determined as RS3, RS2, and RS1 in descending order.

In the aspect of the invention, (Exp. 1) which is used in the relay determination of a received signal having a high undetected error probability can be used in the above-described relay determination of a received signal having a low undetected error probability. In this case, because of the property that the undetected error probability in the received signal is low, it is estimated that the result of the error detection in each RS has a high reliability, and hence the threshold Th_RS indicated by (Exp. 1) is set to be low. Namely, when each RS sets the threshold Th_RS in accordance with the undetected error probability in the function of error detection, an RS can determine by using one determination expression indicated by (Exp. 1) whether the radio signal has been received from the MS, irrespective of the magnitude of the value of the undetected error probability.

Furthermore, a relaying RS is autonomously selected from all of RS1 and RS2 which satisfy the predetermined quality corresponding to the function of error detection in an RS, based on the channel quality from the MS to the RS. In the aspect of the invention, as shown in FIG. 2, in the case where a signal having a high undetected error probability is to be relayed, the relaying RS which is autonomously selected by RSs is RS2.

Figure 4:
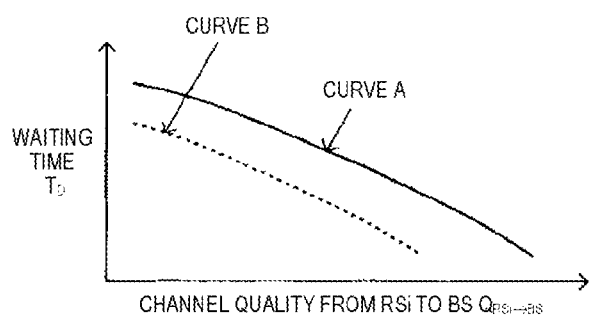
FIG. 4 is a graph showing relationships between a waiting time and the channel quality from an RS to the BS according to the aspect of the invention.

Hereinafter, a method in which, from RSs which are provided with priorities as described above, the RSs select a relaying RS in the embodiment of the invention will be described with reference to FIG. 4. FIG. 4 is a graph showing relationships between a waiting time T_D and the channel quality Q_(RSi→BS) from an RS to the BS in the aspect of the invention. In the aspect of the invention, as an example, a method which uses the relay waiting time in an RS will be described.

In FIG. 4, the curve A (solid line) shows relationships between the channel quality Q_(RSi→BS) from RS_i to the BS and the waiting time T_D in the case where the undetected error probability is low, and the curve B (broken line) shows those in the case where the undetected error probability is high.

The two curves A, B shown in FIG. 4 are expressed as a function indicated by (Exp. 2) showing relationships between the channel quality Q_(RSi→BS) from RS_i to the BS and the waiting time T_D. In (Exp. 2), T_max indicates the maximum waiting time, and α indicates a weighting coefficient. Alternatively, α may be an arbitrary constant value or a parameter which is changed in accordance with the function of error detection.

[Exp. 2]

$$T_D = \frac{\alpha}{Q_{RSi \to BS}} T_{max} \quad \text{(Exp. 2)}$$

Referring to FIG. 4, it is seen that the relay waiting time in an RS in which the channel quality from RSi to the BS is high is short. Therefore, an RS in which the channel quality from RSi to the BS is higher can earlier start relaying. The quality of the X-intercept of each of the curves corresponds to the threshold Th_RS according to the function of error detection in the relayed signal.

The weighting coefficient α included in (Exp. 2) may be an arbitrary constant value or a parameter which is changed in accordance with the function of error detection. Moreover, another parameter of wireless transmission may be reflected to the weighting coefficient α.

For example, the number of retransmissions from the MS may be reflected. In wireless transmission, in the case where a reception error occurs on the reception side (RS), usually, the transmission side (MS) is requested to perform retransmission. When the MS retransmits the signal, the RS can combine the previously received data with the retransmitted data so as to improve the reception characteristics. Even when the undetected error probability in the radio signal transmitted from the MS is high, therefore, the threshold Th_RS in the case a retransmitted signal can be set to a quality which is higher than that in the case where the signal is not a retransmitted signal, by the gain of the combining of the retransmitted signal with the previous signal. When the number of retransmissions is increased, a large combining gain in the RS can be obtained, and hence the threshold Th_RS can be set to a higher quality.

In the aspect of the invention, as shown in FIG. 4, the waiting time corresponding to the priority of relaying is set to the time from when an RS receives the radio signal (hereinafter, referred to as relayed signal) to when the RS relays the signal to the BS. Then, the RSs start relaying in descending priority. In each RS, when a relayed signal from another RS is not detected during the own waiting time, the own RS relays the relayed signal. As shown in FIG. 4, the waiting time corresponding to the priority is made correspond to the channel quality from the RS to the BS, thereby allowing an RS in which the channel quality from the RS to the BS is high, to preferentially relay the relayed signal.

In the aspect, therefore, a relay station apparatus in which the possibility of relaying erroneous information is low can be selected in accordance with the function of error detection in the signal to be relayed by the relay station apparatus. Aside from the method which is shown in FIG. 4, and in which the priority of relaying is determined by using a function, there is a method in which the relaying RS notifies other RSs of the own priority. For example, a method may be contemplated in which an RS in which it is determined that the radio signal transmitted from the MS has been received, and the channel quality with respect to the MS satisfies a required quality notifies other RSs and the BS of information of the channel quality from the own RS to the BS. In this case, in each RS, the channel quality with respect to the MS which is notified from the relay RS is compared with the own channel quality with respect to the MS, and the RS having the highest channel quality is set as the relaying RS. The series of processes may be once notified from each RS to the BS, and the BS may control the relaying RS.

In the aspect of the invention, the case of a single hop in which an RS relays a signal only once has been exemplarily described as a mode in which an RS relays a signal. The invention is not limited to this, and may be applied also to a multi-hop in which a signal is relayed by using a plurality of RSs. In this case, in each relaying stage, the previous relaying RS is deemed as the MS, and the RS of the next relay destination is deemed as the relaying RS, thereby enabling the above-described relay method to be applied to a multi-hop.

In the aspect of the invention, attention is focused on the difference of the function of error detection in the signal relayed by an RS. However, a case where signals having different functions of error detection in one system are relayed, or that where signals having different function of error detections are relayed in different systems may be possible. As signals having different functions of error detection in one system, for example, there are data and control information. There is a case where data have a function of error detection in which the undetected error probability is high, but control information has a function of error detection in which the undetected error probability is low, or does not have a function of error detection. As different systems, for example, there is a case where functions of error detection are different from one another according to respective systems.

In the aspect of the invention, an uplink has been described. A similar process can be applied also to a downlink (a channel from the BS to the MS). In this case, a quality which is measured in the MS by using a signal transmitted from an RS is fed back to the RS, thereby allowing the RS to know the quality of the transmission channel from the RS to the MS.

First Embodiment

Figure 5:
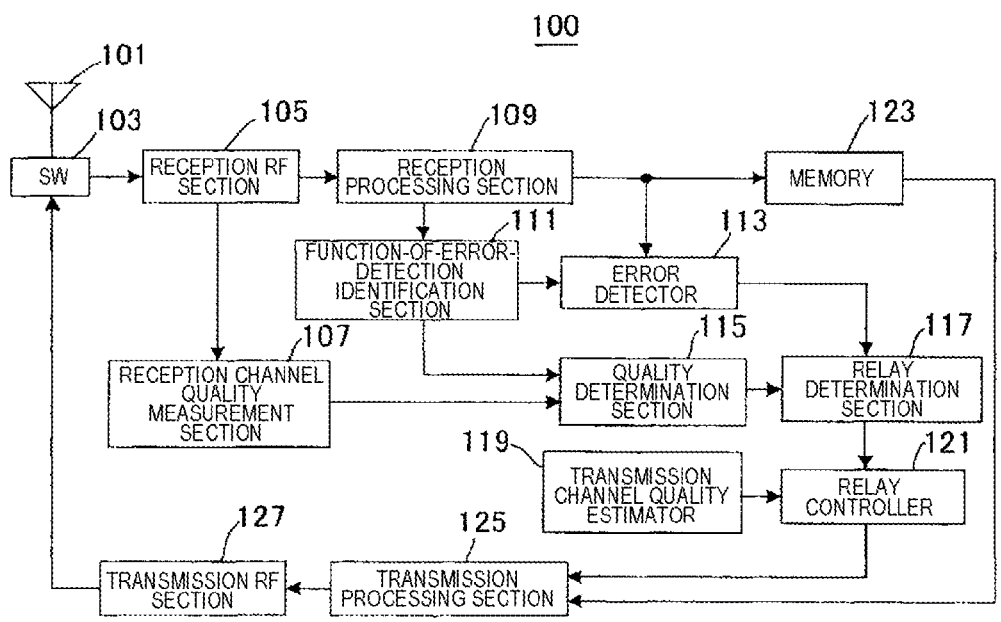
FIG. 5 is a block diagram showing the configuration of a relay station apparatus 100 according to a first embodiment.
Figure 6:
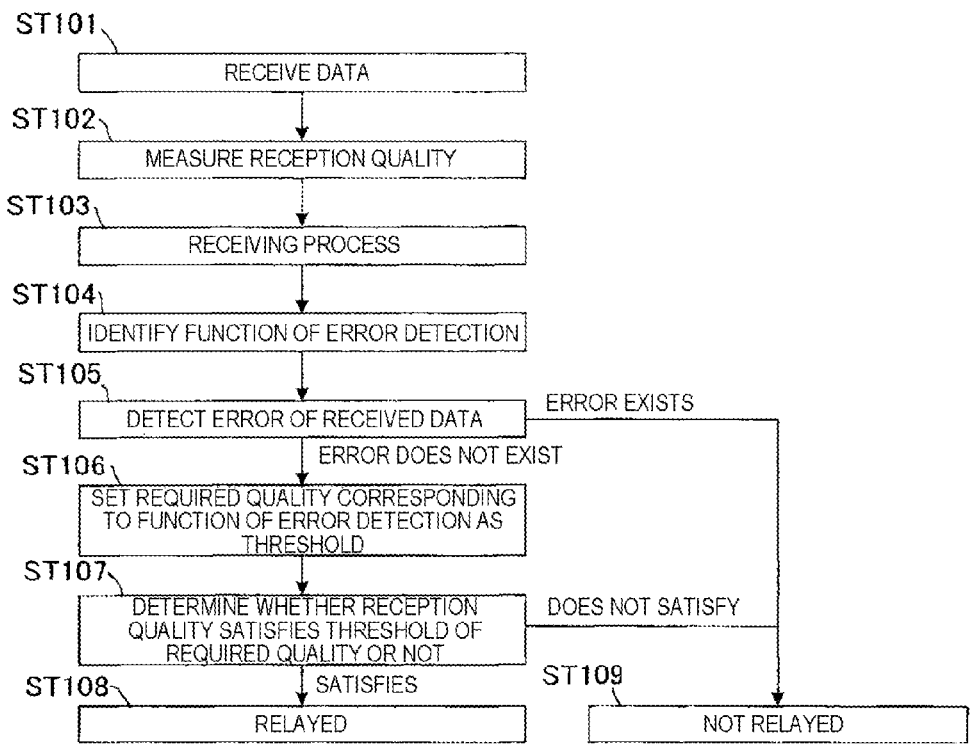
FIG. 6 is a chart showing relay determination process flow 1 in the relay station apparatus 100 according to the first embodiment.

Next, a relay station apparatus (relay station) 100 which realizes the aspect of the invention will be described with reference to FIGS. 5 and 6. FIG. 5 is a block diagram showing the configuration of the relay station apparatus 100 according to a first embodiment. FIG. 6 is a chart showing relay determination process flow 1 in the relay station apparatus 100 according to the first embodiment. As shown in FIG. 5, the relay station apparatus 100 according to the first embodiment includes an antenna 101, an RF switch (SW) 103, a reception RF section 105, a reception channel quality measurement section 107, a reception processing section 109, a function-of-error-detection identification section 111, an error detector 113, a quality determination section 115, a relay determination section 117, a transmission channel quality estimator 119, a relay controller 121, a memory 123, a transmission processing section 125, and a transmission RF section 127.

The reception RF section 105 performs a filtering process, and processes in the RF frequency band such as a frequency conversion to the IF frequency band or the baseband frequency band, on a signal received by the antenna 101.

The reception channel quality measurement section 107 measures the reception quality (channel quality) from the MS to an RS, by using the received signal. As the reception quality, there are the reception power, the CNR, the SNR, the SIR, the SINR, the path loss, and the like. In the reception measurement, data of the received signal, a reference signal configured by a known signal series contained in the received signal, and the like are used.

The reception processing section 109 performs a receiving process on the received signal which has undergone the processes in the RF frequency band in the reception RF section 105. For example, in the case where a process of demodulating the received signal is performed and error correction coding is performed on the received signal, the reception processing section 109 performs a decoding process.

The function-of-error-detection identification section 111 identifies presence or absence of a function of error detection in the received signal, and the reliability of the function of error detection thereof. In the case where the received signal contains control information, and information of a function of error detection is contained in the control information, the identification is performed by using it. In the case where the signal format is previously correlated with the function of error detection, the function-of-error-detection identification section 111 identifies the function of error detection from the signal format.

The error detector 113 detects whether an error occurs in the received signal which has undergone the receiving process in the reception processing section. Examples of a method of detecting an error are a CRC and a parity bit.

The quality determination section 115 sets a required reception quality corresponding to the function of error detection in the received signal which is identified in the function-of-error-detection identification section 111, as a threshold, and compares it with the reception quality measured in the reception channel quality measurement section 107 to determine whether the reception quality satisfies the threshold of the required quality or not.

Specifically, by using (Exp. 1) above, the threshold Th_RS of the predetermined reception quality corresponding to the function of error detection in the radio signal received from the MS is compared with the channel quality Q_(MS→RSi) from the MS to the RS. Namely, if the channel quality Q_(MS→RSi) from the MS to the RS is higher than the threshold Th_RS (in other words, the relationship satisfying (Exp. 1)), it is determined that the radio signal received from the MS satisfies the required quality corresponding to the function of error detection in the radio signal. Here, the threshold Th_RS is adequately set in accordance with the function of error detection in the received signal which is identified in the function-of-error-detection identification section 111. Therefore, the determination whether the radio signal has been received from the MS or not can be made by using one determination expression indicated by (Exp. 1), irrespective of the magnitude of the value of the undetected error probability in the received signal.

The relay determination section 117 determines whether relaying is to be performed or not, while using the detection result of the error detector and the determination result of the quality determination section, based on relay determination process flow 1 shown in FIG. 6.

The transmission channel quality estimator 119 estimates the quality of a channel from the relay station apparatus to a receiver which is not shown (in this case, a base station apparatus), i.e., the quality of the transmission channel as viewed from the relay station apparatus. In the estimation, a method in which the relay station apparatus receives a signal transmitted from the receiver which is not shown, and the estimation is performed, that in which the receiver which is not shown feeds back a quality measured in the receiver, and the estimation is performed, or the like may be used.

The relay controller 121 controls a relaying process based on the result of the determination which has been made by the relay determination section 117 whether relaying is to be performed or not. Furthermore, the relay controller 121 controls the priority corresponding to the transmission channel quality by using the quality of the transmission channel which is estimated in the transmission channel quality estimator 119. Examples of the method of controlling the priority are a method in which the relay waiting time is used, and a method in which notification to another relay station apparatus is performed.

The memory 123 stores received data on which the receiving process has been performed in the reception processing section.

The transmission processing section 125 performs a transmitting process on the received data stored in the memory 123, in accordance with instructions from the relay controller 121. As the transmitting process, there are the error correction coding process, a modifying process, and the like. In the case where there is a function of error detection, a process which is necessary in error detection. For example, there is a process which is necessary in a CRC.

The transmission RF section 127 performs processes in the RF frequency band such as a frequency conversion to the RF frequency band, power amplification, and a filtering process, on a transmitted signal produced in the transmission processing section 125.

The RF switch 103 performs a switching operation so that the signal received by the antenna 101 is connected to the reception RF section 105, and the signal from the transmission RF section is connected to the antenna.

[Relay Determination Process Flow 1]

Next, the process in which the relay station apparatus 100 (referred to as the RS) according to the first embodiment of the invention determines whether the radio signal transmitted from the MS is to be relayed or not will be described with reference to FIG. 6. FIG. 6 is a chart showing relay determination process flow 1 in the first embodiment.

In step ST101, first, the reception RF section 105 receives data transmitted from the MS through the antenna 101.

In step ST102, next, the reception channel quality measurement section 107 measures the channel quality (reception quality) from the MS to the RS, by using the data which are received in step ST101.

In step ST103, next, the reception processing section 109 performs the receiving process on the data which are received in step ST101. In the case where a process of demodulating the received signal is performed and thus error correction coding is found to be performed on the received data, a decoding process is performed.

In step ST104, next, the function-of-error-detection identification section 111 identifies the function of error detection in the data on which the receiving process is performed in step ST103. In the case where control information is contained in the received data and information of the function of error detection is contained in the control information, the function-of-error-detection identification section 111 identifies the function of error detection in the data by using the information of the function of error detection. In the case where the signal format is previously correlated with the function of error detection, the function-of-error-detection identification section 111 identifies the function of error detection from the signal format.

In step ST105, next, the error detector 113 detects an error of the data on which the receiving process is performed in step ST103. Examples of a method of detecting an error are a CRC and a parity bit. If the error detector 113 determines that "ERROR EXISTS", for example, the RS has not received data, and therefore the control proceeds to step ST109. By contrast, if the error detector 113 determines that "ERROR DOES NOT EXIST", the control proceeds to step ST106.

In step ST106, next, the quality determination section 115 sets a required quality corresponding to the function of error detection in the data which are identified in step ST104, as a threshold, and the control proceeds to step ST107.

In step ST107, next, the relay determination section 117 compares the channel quality from the MS to the RS which is measured in step ST102, with the threshold of the required quality which is set in step ST106, and determines whether the channel quality from the MS to the RS satisfies the required quality or not. If the relay determination section 117 determines that "SATISFIES", the control proceeds to step ST108. By contrast, if the relay determination section 117 determines that "DOES NOT SATISFY", there is a possibility of error missing, and hence the control proceeds to step ST109.

In step ST108, the relay controller 121 controls the relaying process of relaying the data, based on the result of the determination in step ST107. Then, the relaying-processed data undergo the processes in the transmission processing section 125 and the transmission RF section 127, and thereafter transmitted from the antenna 101 through the RF switch 103.

In step ST109, the relay determination section 117 determines that the data are not to be relayed.

As described above, the relay station apparatus 100 according to the first embodiment of the invention performs the process of determining whether the radio signal transmitted from the MS is to be relayed or not, based on relay determination process flow 1 shown in FIG. 6. Then, the relay station apparatus 100 according to the first embodiment of the invention sets priorities to RSs which are to perform relaying, by using (Exp. 2) above, whereby a relaying RS which is to relay the radio signal can be selected in accordance with the function of error detection in the radio signal. In the embodiment, therefore, the relay station apparatus 100 in which the possibility of relaying erroneous information is low can be selected in accordance with the function of error detection in the signal to be relayed by the relay station apparatus 100.

Therefore, the relay station apparatus 100 according to the first embodiment of the invention can prevent erroneous information from being relayed, and the frequency use efficiency from being lowered.

Second Embodiment

Next, a relay station apparatus (relay station) 200 according to a second embodiment of the invention will be described. In the embodiment, in the case of a single hop in which only one RS is used in the range from the transmission-side apparatus (MS) to the receiver (BS), a signal which is relayed by the RS must reach the BS without error. Consequently, the channel quality from the RS to the BS is important.

Therefore, the relay station apparatus 200 according to the second embodiment performs a relay determining process based on the reception quality in the RS (the channel quality from the MS to the RS) and the transmission quality as viewed from the RS (the channel quality from the RS to the BS). Specifically, the relay station apparatus 200 according to the second embodiment performs the relay determining process based on a relative value of the channel quality from the MS to the RS and that from the RS to the BS.

Figure 7:
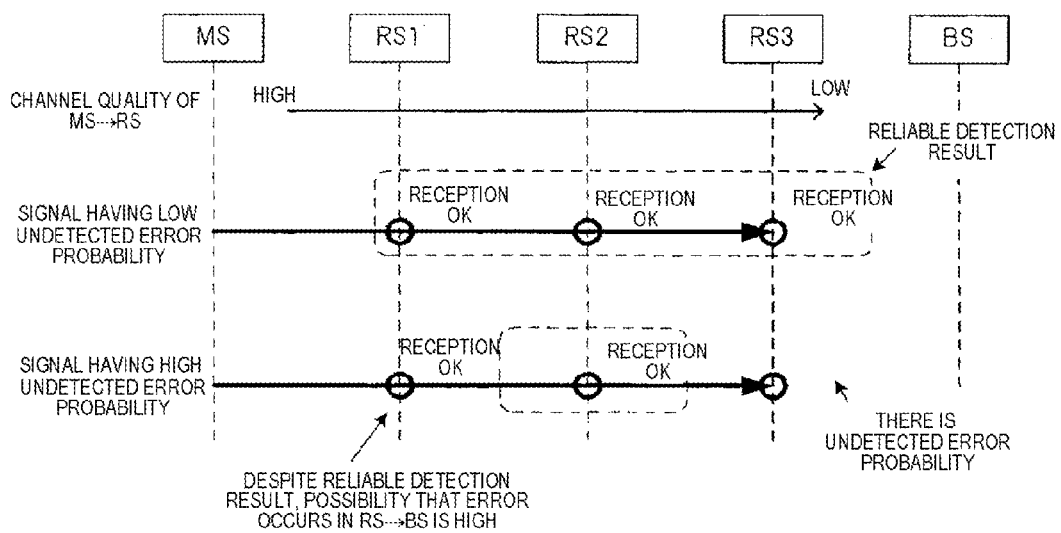
FIG. 7 is a diagram showing relaying in an uplink in a second embodiment.

Here, the manner of relaying in an uplink in the second embodiment will be described with reference to FIG. 7 while separately considering a case where the undetected error probability in the radio signal transmitted from the MS is low, and that where the undetected error probability in the radio signal transmitted from the MS is high. FIG. 7 is a diagram showing the manner of relaying in an uplink in the second embodiment.

(Relaying of Radio Signal Having Low Undetected Error Probability)

The radio signal which is received from the MS has a property that the undetected error probability is low, and hence it is estimated that the result of the error detection in each RS has a high reliability. Therefore, the relaying RS is selected from all RSs in which it is determined that the respective RSs have received the radio signal from the MS without error.

Similarly with the first embodiment, here, the relaying RS in the embodiment is a relay station apparatus (relay station) which relays the radio signal received from the MS, to the BS.

Referring to FIG. 7, in the case where the undetected error probability in the radio signal received from the MS is low, relay stations in which it is determined that the corresponding RS has received without error (in FIG. 7, indicated as RECEPTION OK) are RS1, RS2, and RS3. Similarly with the first embodiment, when the relationships shown in FIG. 4 between the priority of the relaying and the channel quality from the RS to the BS are used, the priorities of the relaying in the RSs are determined as RS3, RS2, and RS1 in descending order. As shown in FIG. 7, in the case where a signal having a low undetected error probability is to be relayed in the embodiment of the invention, therefore, the relaying RS is RS3.

As described above, in the case where an RS is to relay a signal having a low undetected error probability, it is estimated that the reliability of the result of error detection in the relay station is high. Therefore, each RS determines whether the received signal from the MS is to be relayed or not, based on the channel quality from the RS to the BS.

In the case where each RS is to relay a radio signal having a high undetected error probability (in other words, the reliability of the result of error detection in the relay station is low), however, the RS determines the received signal from the MS is to be relayed or not, based on the channel quality from the MS to the RS in addition to that from the RS to the BS. In the case of the embodiment, the radio signal is relayed from the MS to the BS by one RS, and hence the BS must receive the radio signal relayed by the RS, without error. Moreover, there is a possibility that a undetected error probability occurs also in the BS, and therefore also the channel quality from the RS and the BS must be high.

(Relaying of Radio Signal Having High Undetected Error Probability)

In the embodiment, in the case where an RS is to relay a radio signal having a high undetected error probability, therefore, an RS in which the reception quality in the RS (the channel quality from the MS to the RS) and the transmission quality in the RS (the channel quality from the RS to the BS) are similar in degree, or namely the relative value of both the channels is close to 1 performs the relaying.

In FIG. 7, relay stations in which it is determined that the corresponding RS has received without error (in FIG. 7, indicated as RECEPTION OK) are RS1, RS2, and RS3. Among these RSs, an RS in which the reception quality in the RS (the channel quality from the MS to the RS) and the transmission quality in the RS (the channel quality from the RS to the BS) are similar in degree, or namely the relative value of both the channels is close to 1 is RS2. Therefore, RS2 is a relaying RS.

Figure 8:
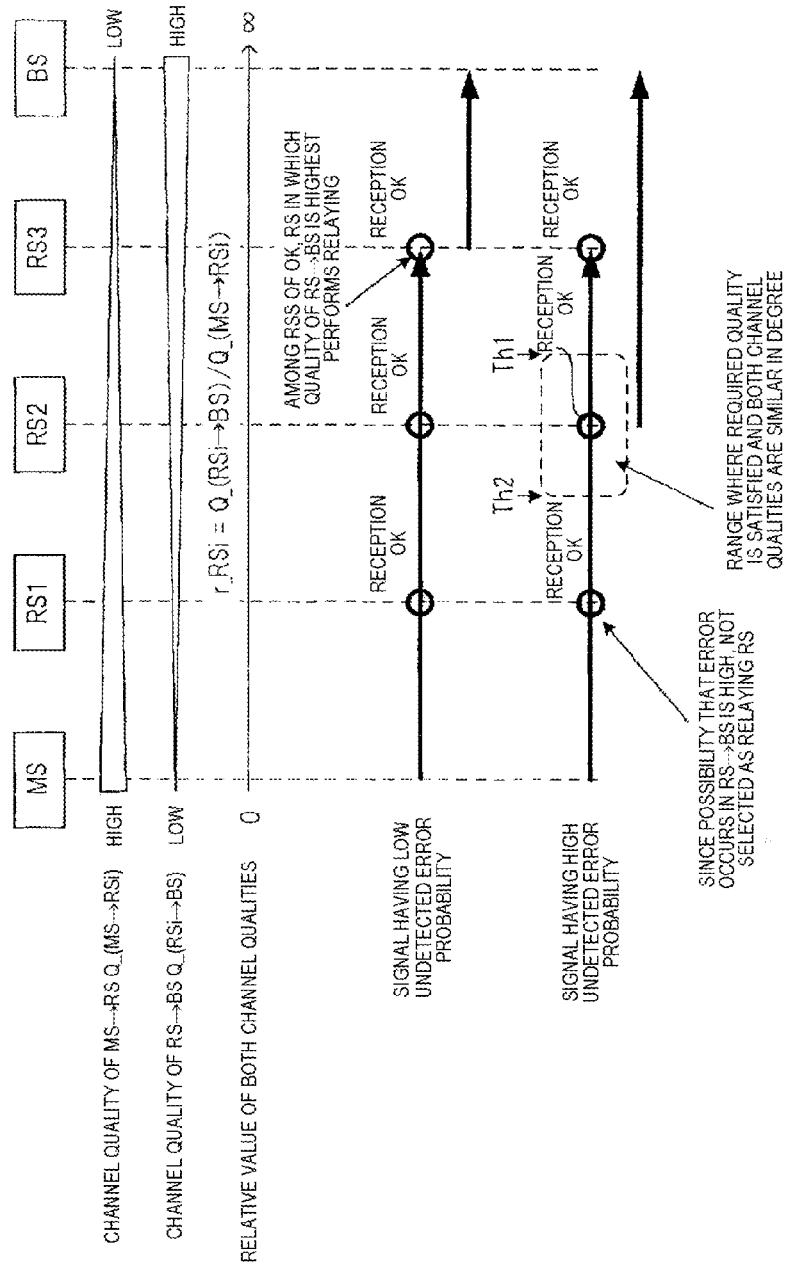
FIG. 8 is a diagram showing the manner of selecting a relaying RS in the second embodiment.

Next, a method in which, in the embodiment, in accordance with the undetected error probability in the radio signal to be relayed by an RS, a relaying RS is selected based on the reception quality in the RS (the channel quality from the MS to the RS) and the transmission quality in the RS (the channel quality from the RS to the BS) will be specifically described with reference to FIG. 8. FIG. 8 is a diagram showing the manner of selecting a relaying RS in the second embodiment.

In the case of a radio signal having a low undetected error probability, first, a relaying RS is selected in the same method as the first embodiment. Namely, because the undetected error probability in the radio signal is low, it is estimated that the result of the error detection in each RS has a high reliability. As shown in FIG. 8, among RS1, RS2, and RS3 in which it is determined that the corresponding RS has received without error (in FIG. 8, indicated as RECEPTION OK), RS3 in which the channel quality Q_(RSi→BS) from an RS to the BS is highest is selected as a relaying RS.

In the case of a radio signal having a high undetected error probability, the result of the error detection in each RS has a low reliability.

When a relaying RS is selected based only on the channel quality Q_(RSi→BS) from an RS to the BS from RS1, RS2, and RS3 in which it is determined that the corresponding RS has received without error (in the figure, indicated as RECEPTION OK), therefore, there is a possibility that erroneous information is relayed. In order to receive by the BS the radio signal which has been relayed, without error, the best RS is selected as a relaying RS based on the channel quality Q_(RSi→BS) from the RS to the BS. Hereinafter, the method of selecting a relaying RS will be described with reference to FIG. 8.

In FIG. 8, the RSs perform a receiving process on the radio signal received from the MS to detect an error. Then, the RSs calculate the relative value of the channel quality from the MS to the RS and that from the RS to the BS. When the channel quality from the MS to RSi is indicated as Q_(MS→RSi) and the channel quality from RSi to the BS is indicated as Q_(RSi→BS), the relative value r_RSi of the channel quality from the MS to the RS and that from the RS to the BS can be expressed by (Exp. 3).

[Exp. 3]

$$r_{RSi} = \frac{Q_{RSi \to BS}}{Q_{MS \to RSi}} \quad \text{(Exp. 3)}$$

Next, the RSs set a threshold Th1_RS of a required quality in which the result of the error detection in the corresponding RS can be sufficiently reliable, and a threshold Th2_RS at which a signal relayed by the RS has a channel quality in which the result of the error detection in the BS can be sufficiently reliable. Then, a relaying RS is selected from RSs in which it is determined that the relative value r_RS indicated by (Exp. 3), and the thresholds Th1_RS and Th2_RS satisfy relationships expressed by (Exp. 4) below.

[Exp. 4]

$$Th2_{RS} < r_{RSi} < Th1_{RS} \quad \text{(Exp. 4)}$$

Figure 9:
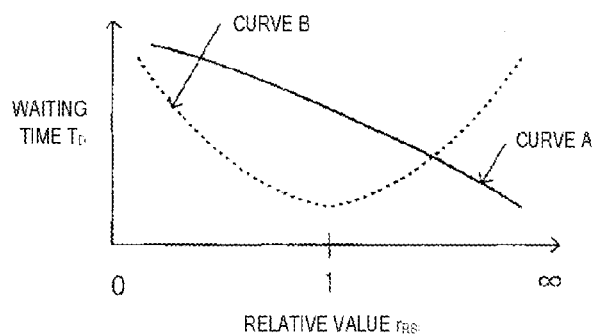
FIG. 9 is a graph showing relationships between a relative value r_RSi and a waiting time of a relayed signal in the second embodiment.

Next, a method of selecting a relaying RS in the embodiment will be described with reference to FIG. 9. A method in which the relay waiting time in an RS is used will be described. FIG. 9 is a graph showing relationships between the waiting time T_D (ordinate) in the RS and the relative value r_RS indicated by (Exp. 3). In FIG. 9, the curve A indicated by the solid line shows a case where the undetected error probability is low, and the curve B indicated by the broken line shows a case where the undetected error probability is high.

Hereinafter, a process in which the relationships shown in FIG. 9 are derived will be described.

The waiting time T_D of the relayed signal in each RS can be expressed as shown in (Exp. 6) by using the channel quality Q_(MS→RSi) from the MS to RSi, the channel quality Q_(RSi-BS) from RSi to the BS, and an evaluation function E_RSi indicated by (Exp. 5).

[Exp. 5]

$$E_{RSi} = \frac{\left(\frac{1}{Q_{MS \to RSi}} \left(\alpha + \beta \frac{1}{r_{RSi}}\right)\right)^{-1}}{Q_{min}} \quad \text{(Exp. 5)}$$

Here, Q_min included in (Exp. 5) indicates a normalization coefficient.

[Exp. 6]

$$T_D = \frac{1}{E_{RSi}} T_{max} \quad \text{(Exp. 6)}$$

Here, r_RSi is the relative value of Q_(MS→RSi) and Q_(RSi-BS). Moreover, α and β are weighting coefficients, or may be arbitrary constant values or parameters which are changed in accordance with the function of error detection.

From (Exp. 5) and (Exp. 6), therefore, the relative value r_RSi and the waiting time T_D of the relayed signal have relationships shown FIG. 9.

Here, when Q_(MS→RSi) and Q_(RSi-BS) are used, the evaluation function E_RSi indicated by (Exp. 5) can be expressed as shown in (Exp. 7) below. In this case, when thresholds of required qualities are set for Q_(MS→RSi) and Q_(RSi-BS), respectively, the same as the case where the relative value is used can be realized.

[Exp. 7]

$$E_{RSi} = \frac{\left(\alpha \frac{1}{Q_{MS \to RSi}} + \beta \frac{1}{Q_{RSi \to BS}}\right)^{-1}}{Q_{min}} \quad \text{(Exp. 7)}$$

Here, Q_min included in (Exp. 7) indicates a normalization coefficient.

In the relay station apparatus 200 according to the second embodiment of the invention, as described above, a relaying RS is selected from RSs in which it is determined that the relative value r_RS and the thresholds Th1_RS and Th2_RS satisfy the relationships expressed by (Exp. 4). Furthermore, a relaying RS is selected by determining the priority of the relaying RS from relationships between the relative value r_RSi and the waiting time T_D of the relayed signal which are obtained from (Exp. 5) and (Exp. 6). In the embodiment, therefore, the relay station apparatus 200 in which the possibility that erroneous information is relayed is low can be selected in accordance with the function of error detection in a signal to be relayed by the relay station apparatus 200.

Therefore, the relay station apparatus 200 according to the second embodiment of the invention can prevent erroneous information from being relayed, and the frequency use efficiency from being lowered.

Figure 10:
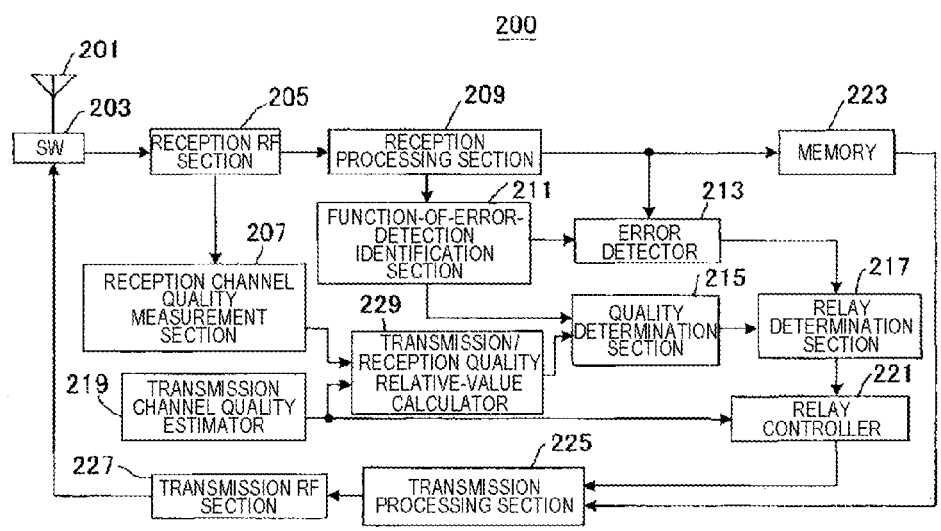
FIG. 10 is a block diagram showing the configuration of a relay station apparatus 200 according to the second embodiment.

Next, the configuration of the relay station apparatus 200 according to the second embodiment will be described with reference to FIG. 10. FIG. 10 is a block diagram showing the configuration of the relay station apparatus 200 according to the second embodiment. One of points in which the relay station apparatus according to the second embodiment is different from that according to the first embodiment is that an output of a transmissionRSreception quality relative-value calculator 229 is input to the quality determination section 215. As shown in FIG. 10, the relay station apparatus 200 according to the second embodiment includes an antenna 201, an RF switch 203, a reception RF section 205, a reception channel quality measurement section 207, a reception processing section 209, a function-of-error-detection identification section 211, an error detector 213, a quality determination section 215, a relay determination section 217, a transmission channel quality estimator 219, a relay controller 221, a memory 223, a transmission processing section 225, a transmission RF section 227, and the transmissionRSreception quality relative-value calculator 229.

The reception RF section 205 performs a filtering process, and processes in the RF frequency band such as a frequency conversion to the IF frequency band or the baseband frequency band, on a signal received by the antenna 201.

The reception channel quality measurement section 207 measures the reception quality (channel quality) from the MS to an RS, by using the received signal. As the reception quality, there are the reception power, the CNR, the SNR, the SIR, the SINR, the path loss, and the like. In the reception measurement, data of the received signal, a reference signal configured by a known signal series contained in the received signal, and the like are used.

The reception processing section 209 performs a receiving process on the received signal which has undergone the processes in the RF frequency band in the reception RF section 205. For example, in the case where a process of demodulating the received signal is performed and error correction coding is performed on the received signal, the reception processing section 209 performs a decoding process.

The function-of-error-detection identification section 211 identifies presence or absence of a function of error detection in the received signal, and the reliability of the function of error detection thereof. In the case where the received signal contains control information, and information of a function of error detection is contained in the control information, the identification is performed by using it. In the case where the signal format is previously correlated with the function of error detection, the function-of-error-detection identification section 211 identifies the function of error detection from the signal format.

The error detector 213 detects whether an error occurs in the received signal which has undergone the receiving process in the reception processing section. Examples of a method of detecting an error are a CRC and a parity bit.

The transmissionRSreception quality relative-value calculator 229 calculates the relative value r_RS of the qualities of the transmissionRSreception channels indicated by (Exp. 3) from the quality information of the reception channel which is measured in the reception channel quality measurement section 207, and that of the transmission channel which is estimated in the transmission channel quality estimator 219 that is described later.

The quality determination section 215 sets the threshold Th1_RS which indicates the required reception quality corresponding to the function of error detection in the received signal which is identified in the function-of-error-detection identification section 211, and the threshold Th2_RS which indicates the transmission quality corresponding to the function of error detection in the relayed signal, and compares them with the relative value r_RS of the qualities of the transmissionRSreception channels calculated in the transmissionRSreception quality relative-value calculator 229, to determine whether the relative value of the transmissionRSreception qualities is within the range of these thresholds indicated by (Exp. 4) or not.

The relay determination section 217 determines whether relaying is to be performed or not, while using the detection result of the error detector 213 and the determination result of the quality determination section 215, based on relay determination process flow 2 shown in FIG. 12.

The transmission channel quality estimator 219 estimates the quality of a channel from the relay station apparatus to a receiver which is not shown (in this case, a base station apparatus), i.e., the quality of the transmission channel as viewed from the relay station apparatus. In the estimation, a method in which the relay station apparatus receives a signal transmitted from the receiver which is not shown, and the estimation is performed, that in which the receiver which is not shown feeds back a quality measured in the receiver, and the estimation is performed, or the like may be used.

The relay controller 221 controls a relaying process based on the result of the determination which has been made by the relay determination section 217 whether relaying is to be performed or not. Furthermore, the relay controller 221 controls the priority corresponding to the transmission channel quality by using the quality of the transmission channel which is estimated in the transmission channel quality estimator 219. Examples of the method of controlling the priority are a method in which the priority of the relaying RS is determined from relationships between the relative value r_RSi and the waiting time T_D of the relayed signal obtained from (Exp. 5) and (Exp. 6), and that in which notification to another relay station apparatus is performed.

The memory 223 stores received data on which the receiving process has been performed in the reception processing section.

The transmission processing section 225 performs a transmitting process on the received data stored in the memory 223, in accordance with instructions from the relay controller 221. As the transmitting process, there are the error correction coding process, a modifying process, and the like. In the case where there is a function of error detection, a process which is necessary in error detection. For example, there is a process which is necessary in a CRC.

The transmission RF section 227 performs processes in the RF frequency band such as a frequency conversion to the RF frequency band, power amplification, and a filtering process, on a transmitted signal produced in the transmission processing section 225.

The RF switch 203 performs a switching operation so that the signal received by the antenna 201 is connected to the reception RF section 205, and the signal from the transmission RF section is connected to the antenna.

[Relay Determination Process Flow 2]

Figure 11:
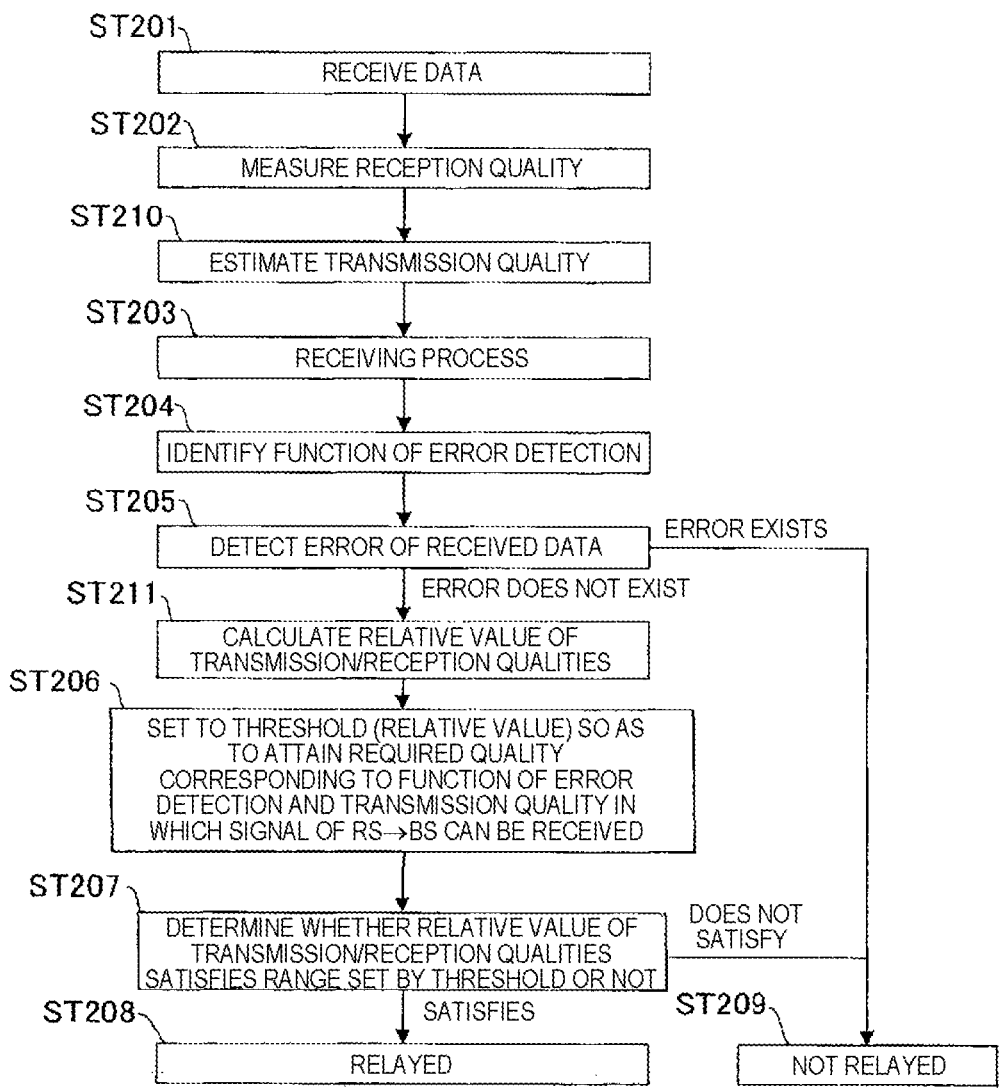
FIG. 11 is a chart showing relay determination process flow 2 in the second embodiment.

Next, the process in which the relay station apparatus 200 according to the second embodiment of the invention determines whether the RS relays the radio signal transmitted from the MS or not will be described with reference to FIG. 11. FIG. 11 is a chart showing relay determination process flow 2 in the second embodiment.

In step ST201, first, the reception RF section 205 receives data transmitted from the MS through the antenna 201.

In step ST202, next, the reception channel quality measurement section 207 measures the channel quality (reception quality) from the MS to the RS, by using the data which are received in step ST201.

In step ST210, next, the transmission channel quality estimator 219 estimates the channel quality (transmission quality) from the RS to the BS.

In step ST203, next, the reception processing section 209 performs the receiving process on the data which are received in step ST201. In the case where a process of demodulating the received signal is performed and error correction coding is found to be performed on the received data, a decoding process is performed.

In step ST204, next, the function-of-error-detection identification section 211 identifies the function of error detection in the data on which the receiving process is performed in step ST203. In the case where control information is contained in the received data and information of the function of error detection is contained in the control information, the function-of-error-detection identification section 211 identifies the function of error detection in the data by using the information of the function of error detection. In the case where the signal format is previously correlated with the function of error detection, the function of error detection identification section 211 identifies the function of error detection from the signal format.

In step ST205, next, the error detector 213 detects an error of the data on which the receiving process is performed in step ST203. Examples of a method of detecting an error are a CRC and a parity bit. If the error detector 213 determines that "ERROR EXISTS", for example, the RS has not received data, and therefore the control proceeds to step ST209. By contrast, if the error detector 213 determines that "ERROR DOES NOT EXIST", the control proceeds to step ST211.

In step ST211, next, the transmissionRSreception quality relative-value calculator 229 calculates the relative value r_RS of the qualities of the transmissionRSreception channels indicated by (Exp. 3) from the reception quality which is measured in step ST202, and the transmission quality which is estimated in step ST210. Then, the control proceeds to step ST206.

In step ST206, next, the quality determination section 215 sets the threshold Th1_RS which indicates the required reception quality corresponding to the function of error detection in the received signal which is identified in the function-of-error-detection identification section 211, and the threshold Th2_RS which indicates the transmission quality corresponding to the function of error detection in the relayed signal.

In step ST207, next, the quality determination section 215 compares the thresholds Th1_RS and Th2_RS which are set in step ST206, with the relative value r_RS of the transmissionRSreception qualities which is calculated in step ST211, and determines whether the relative value r_RS of the transmissionRSreception qualities satisfies the range that is set by the thresholds, or not. If the quality determination section 215 determines that "SATISFIES", the control proceeds to step ST208. If the quality determination section 215 determines that "DOES NOT SATISFY", there is a possibility that error missing occurs, and therefore the control proceeds to step ST209.

In step ST208, the relay controller 221 controls the relaying process of relaying the data, based on the result of the determination in step ST207. Then, the relaying-processed data undergo the processes in the transmission processing section 225 and the transmission RF section 227, and thereafter transmitted from the antenna 201 through the RF switch 203.

In step ST209, the relay determination section 217 determines that the data are not to be relayed.

As described above, the relay station apparatus 200 according to the second embodiment of the invention performs the process of determining whether the radio signal transmitted from the MS is to be relayed or not, based on relay determination process flow 2 which has been described with reference to FIG. 11. In the relay station apparatus 200 according to the second embodiment of the invention, the priority of the relaying RS is determined from the relationships between the relative value r_RS and the waiting time T_D of the relayed signal obtained from (Exp. 5) and (Exp. 6) above, so that the RSs select the relaying RS. In the embodiment, therefore, the relay station apparatus 200 in which the possibility of relaying erroneous information is low can be selected in accordance with the function of error detection in the signal to be relayed by the relay station apparatus 200.

Therefore, the relay station apparatus 200 according to the second of the invention can prevent erroneous information from being relayed, and the frequency use efficiency from being lowered.

In the embodiment of the invention, the case of a single hop in which an RS relays a signal only once has been exemplarily described as a mode in which an RS relays a signal. The invention is not limited to this, and may be applied also to a multi-hop in which a signal is relayed by using a plurality of RSs. In this case, in each relaying stage, the previous relaying RS is deemed as the MS, and the RS of the next relay destination is deemed as the relaying RS, thereby enabling the above-described relay method to be applied to a multi-hop.

In the embodiment of the invention, attention is focused on the difference of the function of error detection in the signal relayed by an RS. However, a case where signals having different functions of error detection in one system are relayed, or a case where signals having different functions of error detection are relayed in different systems may be possible. As signals having different functions of error detection in one system, for example, there are data and control information. There is a case where data have a function of error detection in which the undetected error probability is high, but control information has a function of error detection in which the undetected error probability is low, or does not have a function of error detection. As different systems, for example, there is a case where functions of error detection are different from one another according to respective systems.

In the embodiment of the invention, an uplink has been described. A similar process can be applied also to a downlink (a channel from the BS to the MS). In this case, a quality which is measured in the MS by using a signal transmitted from an RS is fed back to the RS, thereby allowing the RS to know the quality of the transmission channel from the RS to the MS.

Third Embodiment

Next, a relay station apparatus 300 according to the third embodiment will be described.

In the embodiment, a case of a single hop in which an RS relays a signal only once will be exemplarily described as an uplink. In the case of a single hop in which only one RS is used in the range from the transmission-side apparatus (MS) to the receiver apparatus (BS), a signal which is relayed by the RS must reach the BS without error. Consequently, the channel quality from the RS to the BS is important.

While the relay station apparatus 200 according to the second embodiment performs the relay determining process based on a relative value of the channel quality from the MS to the RS and that from the RS to the BS, the relay station apparatus 300 according to the third embodiment performs the relay determining process based also on an absolute value of the channel quality from the MS to the RS and that from the RS to the BS.

In the relay station apparatus according to the second embodiment, in the case where the undetected error probability is high, specifically, the relative value of the channel quality Q_(MS→RSi) from the MS to RSi and the channel quality Q_(RSi→BS) from RSi to the BS is calculated, and it is determined whether the relative value is within the required range or not, thereby determining whether relaying is to be performed or not. By contrast, in the relay station apparatus according to the third embodiment, in addition to the determination of the relative value r_RS indicated by (Exp 4), it is determined whether the average value of the channel quality Q_(MS→RSi) from the MS to RSi and the channel quality Q_(RSi→BS) from RSi to the BS satisfies a required quality or not. Hereinafter, a method of the determination will be described.

First, the average value Ave_RSi of both the channel qualities can be expressed by (Exp. 8) below.

[Exp. 8]

$$Ave_{RSi} = \frac{Q_{MS \to RSi} + Q_{RSi \to BS}}{2} \qquad \text{(Exp. 8)}$$

Then, a threshold Th3_RS is set so that the result of the error detection of the relayed signal is sufficiently reliable. If it is determined that the average quality Ave_RSi and the threshold Th3_RS satisfy the relationship shown in (Exp. 9) below, the RS is determined to perform relaying.

[Exp. 9]

$$\text{Ave}_{RSi} > Th3_{RS} \quad \text{(Exp. 9)}$$

Next, a method in which priorities are provided to RSs which satisfy the relationship shown in (Exp. 9) and a relaying RS is selected will be described with reference to (a) to (c) in FIG. 12 and FIG. 13.

Similarly with the first and second embodiments, here, the relaying RS in the embodiment is a relay station apparatus (relay station) which relays the radio signal received from the MS, to the BS.

In the same manner as the second embodiment, the relative value r_RSi of the channel quality Q_(MS→RSi) from the MS to RSi and the channel quality Q_(RSi-BS) from RSi to the BS is expressed by the evaluation function E_RSi indicated by (Exp. 5).

In the embodiment, moreover, the waiting time is set to be longer as the inverse of the average value of the channel quality Q_(MS→RSi) from the MS to RSi and the channel quality Q_(RSi-BS) from RSi to the BS is larger. This relationship is shown in (a) to (c) in FIG. 12 and FIG. 13.

In FIG. 12, (a) to (c) show relationships between the relative value r_RSi of the channel qualities and the waiting time T_D using the inverse of the average value as a parameter. The curve M1 shown in (a) of FIG. 12 shows a case where the inverse of the average value is A, the curve M2 shown in (b) of FIG. 12 shows a case where the inverse of the average value is B, and the curve M3 shown in (c) of FIG. 12 shows a case where the inverse of the average value is C. The values A, B, and C of the inverse of the average value have a relationship of A<B<C.

Figure 13:
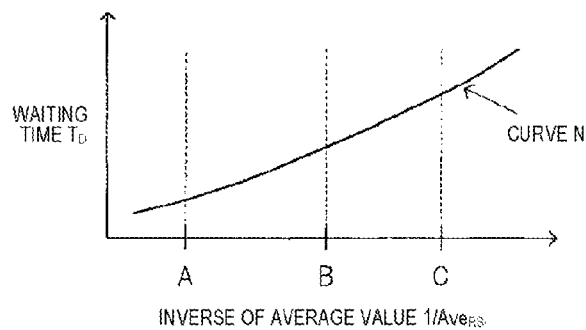
FIG. 13 is a graph in which a case where the relative value in FIG. 12 is 1 is plotted.

FIG. 13 shows a relationship between the inverse of the average value of the channel qualities and the waiting time T_D. The curve N shown in FIG. 13 is a plot in the case where the relative value in FIG. 12 is 1.

Referring to (a) to (c) in FIG. 12, in all of the curves M1 to M3, the waiting time T_D is the shortest when the relative value is 1 at the inverse of each of the average values. In the embodiment, the average value of the channel qualities is calculated from the channel quality Q_(MS→RSi) from the MS to RSi and the channel quality Q_(RSi-BS) from RSi to the BS. Alternatively, the total may be calculated. In this case, a threshold for the total is set.

In the curve N (in the case where the relative value is 1) shown in FIG. 13, it is seen that, as the inverse of the average value is larger, the waiting time T_D is longer.

Figure 14:
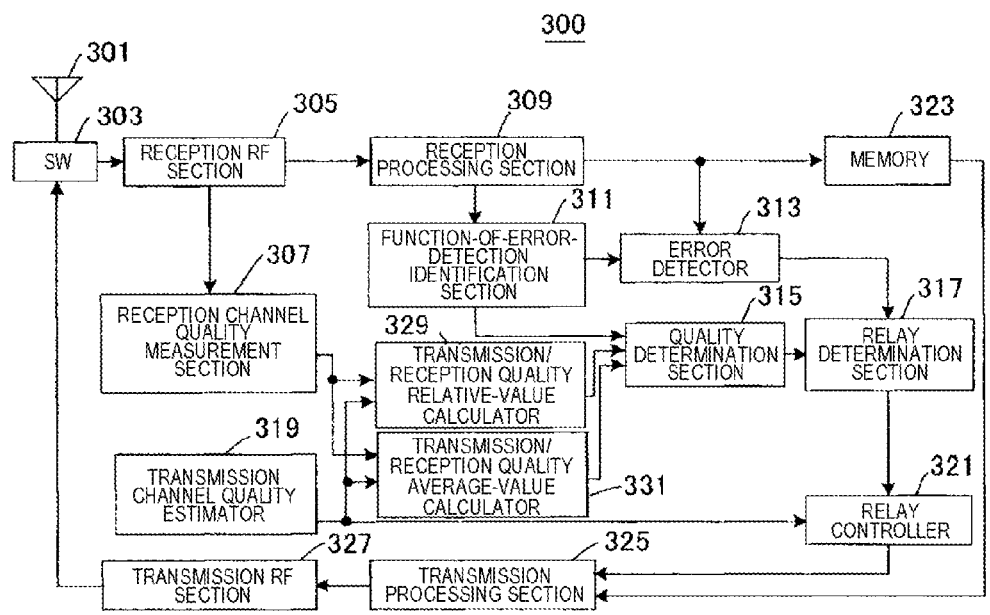
FIG. 14 is a block diagram showing the configuration of a relay station apparatus 300 according to a third embodiment.

Next, the configuration of the relay station apparatus 300 according to the third embodiment of the invention will be described with reference to FIG. 14. FIG. 14 is a block diagram showing the configuration of the relay station apparatus 300 according to the third embodiment. One of points in which the relay station apparatus 300 according to the third embodiment is different from that according to the second embodiment is a transmissionRSreception quality average-value calculator 331 and that its output is input to a quality determination section 315. As shown in FIG. 14, the relay station apparatus 300 according to the third embodiment includes an antenna 301, an RF switch 303, a reception RF section 305, a reception channel quality measurement section 307, a reception processing section 309, a function-of-error-detection identification section 311, an error detector 313, the quality determination section 315, a relay determination section 317, a transmission channel quality estimator 319, a relay controller 321, a memory 323, a transmission processing section 325, a transmission RF section 327, a transmissionRSreception quality relative-value calculator 329, and the transmissionRSreception quality average-value calculator 331.

The reception RF section 305 performs a filtering process, and processes in the RF frequency band such as a frequency conversion to the IF frequency band or the baseband frequency band, on a signal received by the antenna 301.

The reception channel quality measurement section 307 measures the reception quality (channel quality) from the MS to an RS, by using the received signal. As the reception quality, there are the reception power, the CNR, the SNR, the SIR, the SINR, the path loss, and the like. In the reception measurement, data of the received signal, a reference signal configured by a known signal series contained in the received signal, and the like are used.

The reception processing section 309 performs a receiving process on the received signal which has undergone the processes in the RF frequency band in the reception RF section 305. For example, in the case where a process of demodulating the received signal is performed and error correction coding is found to be performed on the received signal, the reception processing section 309 performs a decoding process.

The function-of-error-detection identification section 311 identifies presence or absence of a function of error detection in the received signal, and the reliability of the function of error detection thereof. In the case where the received signal contains control information, and information of a function of error detection is contained in the control information, the identification is performed by using it. In the case where the signal format is previously correlated with the function of error detection, the function-of-error-detection identification section 311 identifies the function of error detection from the signal format.

The error detector 313 detects whether an error occurs in the received signal which has undergone the receiving process in the reception processing section. Examples of a method of detecting an error are a CRC and a parity bit.

The transmissionRSreception quality relative-value calculator 329 calculates the relative value r_RS of the qualities of the transmissionRSreception channels indicated by (Exp. 3) from the quality information of the reception channel which is measured in the reception channel quality measurement section 307, and that of the transmission channel which is estimated in the transmission channel quality estimator 319 that is described later.

The transmissionRSreception quality average-value calculator 331 calculates the average value Ave_RSi of the qualities of the transmissionRSreception channels indicated by (Exp. 8) from the quality information of the reception channel which is measured in the reception channel quality measurement section 307, and that of the transmission channel which is estimated in the transmission channel quality estimator 319.

The quality determination section 315 sets the threshold which indicates the required reception quality corresponding to the function of error detection in the received signal which is identified in the function-of-error-detection identification section 311, and the threshold which indicates the transmission quality corresponding to the function of error detection in the relayed signal, and compares them with the relative value of the qualities of the transmissionRSreception channels calculated in the transmissionRSreception quality relative-value calculator 329, to determine whether the relative value of the transmissionRSreception qualities is within the range of these thresholds or not. Furthermore, the quality determination section 315 sets the threshold for the average value of the transmissionRSreception channels so that the result of the error detection of the relayed signal is sufficiently reliable, and compares it with the average value of the qualities of the transmissionRSreception channels calculated in the transmissionRSreception quality average-value calculator 331. Then, it is determined whether the average value of the transmissionRSreception qualities is within the range set by the threshold or not.

The quality determination section 315 determines whether both the determination of the relative value and the determination of the average value are satisfied or not.

Figure 16:
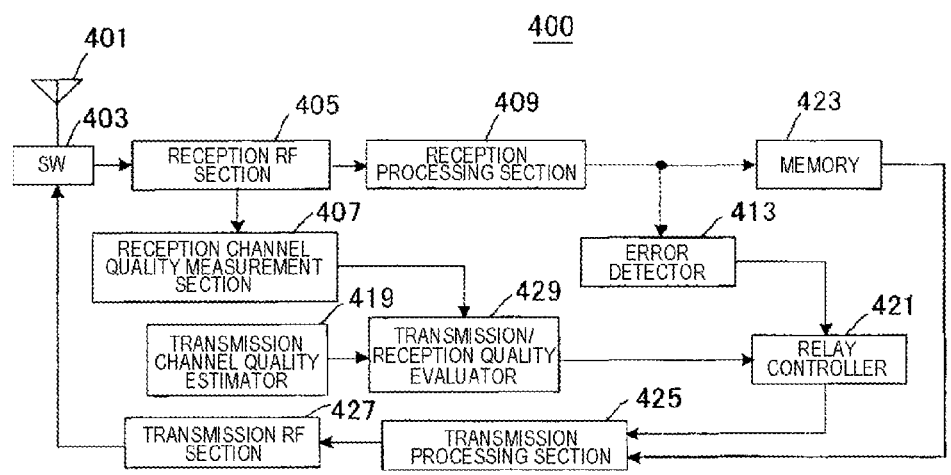
FIG. 16 is a block diagram showing the configuration of a relay station apparatus 400 according to a fourth embodiment.
Figure 17:
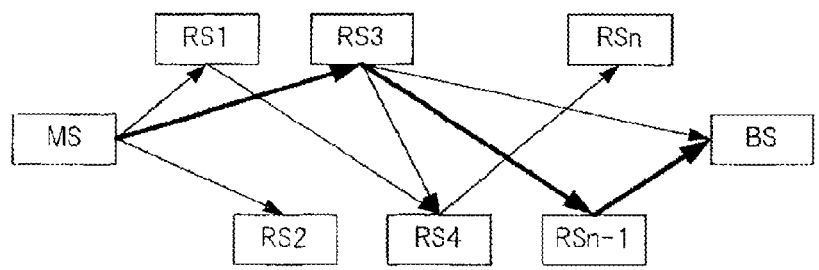
FIG. 17 is a diagram illustrating a multi-hop in an uplink.
Figure 18:
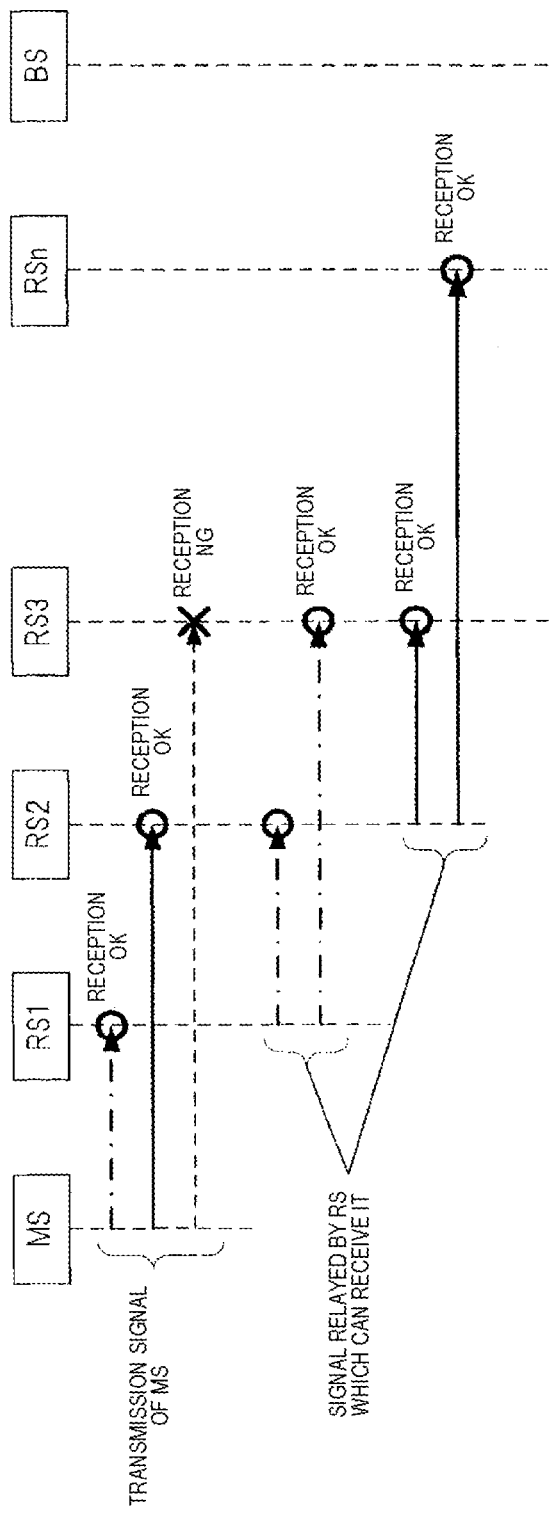
FIG. 18 is a diagram illustrating flooding.
Figure 19:
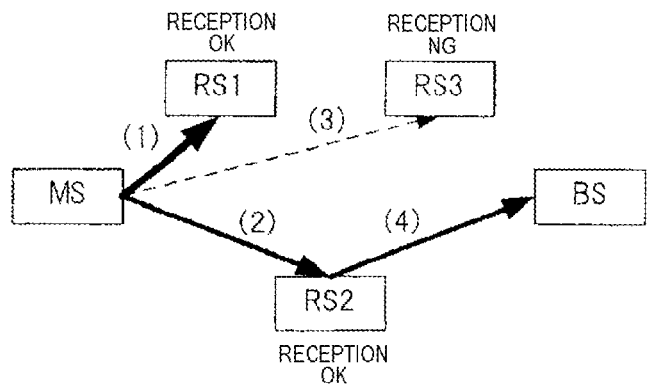
FIG. 19 is a diagram showing relaying in an uplink from an MS to a BS.
Figure 20:
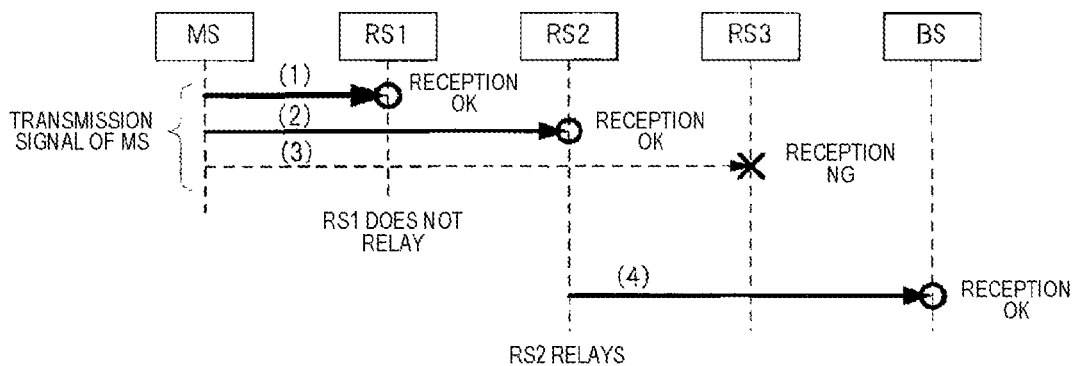
FIG. 20 is a diagram showing a relaying operation shown in FIG. 19.
Figure 21:
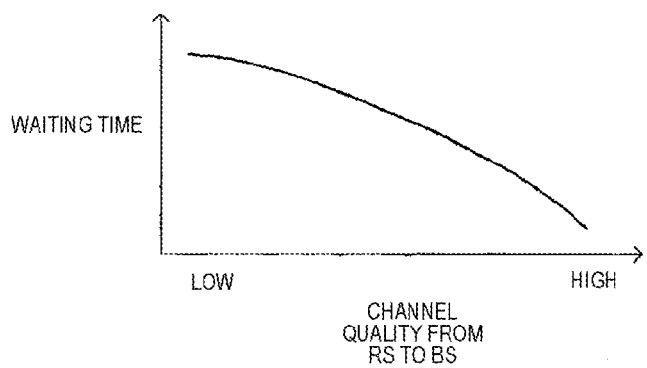
FIG. 21 is a graph showing relationships between the waiting time and the channel quality from the RS to the BS.

The relay determination section 317 determines whether relaying is to be performed or not, while using the detection result of the error detector 313 and the determination result of the quality determination section 315, based on relay determination process flow 3 which is described later, and which is shown in FIG. 16.

The transmission channel quality estimator 319 estimates the quality of a channel from the relay station apparatus to a receiver which is not shown (in this case, a base station apparatus), i.e., the quality of the transmission channel as viewed from the relay station apparatus. In the estimation, a method in which the relay station apparatus receives a signal transmitted from the receiver which is not shown, and the estimation is performed, a method in which the receiver which is not shown feeds back a quality measured in the receiver, and the estimation is performed, or the like may be used.

The relay controller 321 controls a relaying process based on the result of the determination which has been made by the relay determination section 317 whether relaying is to be performed or not. Furthermore, the relay controller 321 controls the priority corresponding to the transmission channel quality by using the quality of the transmission channel which is estimated in the transmission channel quality estimator 319. Examples of the method of controlling the priority are a method in which the priority of the relaying RS is determined from relationships between the relative value r_RSi of the channel qualities obtained from (Exp. 9) and the waiting time T_D, and a method in which notification to another relay station apparatus is performed.

The memory 323 stores received data on which the receiving process has been performed in the reception processing section.

The transmission processing section 325 performs a transmitting process on the received data stored in the memory 323, in accordance with instructions from the relay controller 321. As the transmitting process, there are the error correction coding process, a modifying process, and the like. In the case where there is a function of error detection, a process which is necessary in error detection. For example, there is a process which is necessary in a CRC.

The transmission RF section 327 performs processes in the RF frequency band such as a frequency conversion to the RF frequency band, power amplification, and a filtering process, on a transmitted signal produced in the transmission processing section 325.

The RF switch 303 performs a switching operation so that the signal received by the antenna 301 is connected to the reception RF section 305, and the signal from the transmission RF section is connected to the antenna.

[Relay Determination Process Flow 3]

Next, relay determination process flow 3 in the relay determination section 317 will be described with reference to FIG. 15.

In step ST301, first, the reception RF section 305 receives data transmitted from the MS through the antenna 301.

In step ST302, next, the reception channel quality measurement section 307 measures the channel quality (reception quality) from the MS to the RS, by using the data which are received in step ST301.

In step ST310, next, the transmission channel quality estimator 319 estimates the channel quality (transmission quality) from the RS to the BS.

In step ST303, next, the reception processing section 309 performs the receiving process on the data which are received in step ST301. In the case where a process of demodulating the received signal is performed and error correction coding is found to be performed on the received data, a decoding process is performed.

In step ST304, next, the function-of-error-detection identification section 311 identifies the function of error detection in the data on which the receiving process is performed in step ST303. In the case where control information is contained in the received data and information of the function of error detection is contained in the control information, the function-of-error-detection identification section 311 identifies the function of error detection in the data by using the information of the function of error detection. In the case where the signal format is previously correlated with the function of error detection, the function-of-error-detection identification section 311 identifies the function of error detection from the signal format.

In step ST305, next, the error detector 313 detects an error of the data on which the receiving process is performed in step ST303. Examples of a method of detecting an error are a CRC and a parity bit. If the error detector 313 determines that "ERROR EXISTS", for example, the RS has not received data, and therefore the control proceeds to step ST309. By contrast, if the error detector 213 determines that "ERROR DOES NOT EXIST", the control proceeds to step ST311.

In step ST311, next, the transmissionRSreception quality relative-value calculator 329 calculates the relative value r_RS of the transmissionRSreception qualities indicated by (Exp. 3) from the reception quality which is measured in step ST302, and the transmission quality which is estimated in step ST310. Then, the control proceeds to step ST312.

In step ST312, next, the average value Ave_RSi of the transmissionRSreception qualities indicated by (Exp. 8) is calculated from the reception quality which is measured in step ST302, and the transmission quality which is estimated in step ST310. Then, the control proceeds to step ST306.

In step ST306, next, the quality determination section 315 sets the threshold Th1_RS which indicates the required reception quality corresponding to the function of error detection in the received signal which is identified in the function of error detection identification section 311, and the threshold Th2_RS which indicates the transmission quality corresponding to the function of error detection in the relayed signal. Then, the control proceeds to step ST313.

In step ST313, next, the transmissionRSreception quality average-value calculator 331 sets the threshold for the average value Ave_RSi of an average value transmissionRSreception qualities so as to attain the transmissionRSreception qualities in which the result of the error detection of the relayed signal is sufficiently reliable.

In step ST307, next, the quality determination section 315 compares the relative value of the transmissionRSreception qualities which is calculated in step ST311 with the thresholds which are set in step ST306, and determines whether the relative value satisfies the range that is set by the thresholds, or not. Moreover, the quality determination section 315 compares the average value Ave_RSi of the transmissionRSreception qualities which is calculated in step ST312 with the threshold which is set in step ST313, and determines whether the average value satisfies the range that is set by the threshold, or not.

If the quality determination section 315 determines that both the determination condition for the relative value of the transmissionRSreception qualities, and the determination condition for an absolute value of the transmissionRSreception qualities are "SATISFIED", it is determined that relaying is to be performed, and the control proceeds to step ST308. By contrast, if the quality determination section 315 determines that both the determination condition for the relative value of the transmissionRSreception qualities, and the determination condition for an absolute value of the transmissionRSreception qualities are "NOT SATISFIED", it is determined that relaying is not to be performed, and the control proceeds to step ST309.

In step ST308, the relay controller 321 controls the relaying process of relaying the data, based on the result of the determination in step ST307. Then, the relaying-processed data undergo the processes in the transmission processing section 325 and the transmission RF section 327, and thereafter transmitted from the antenna 301 through the RF switch 303.

In step ST309, the relay determination section 317 determines that the data are not to be relayed.

Figure 15:
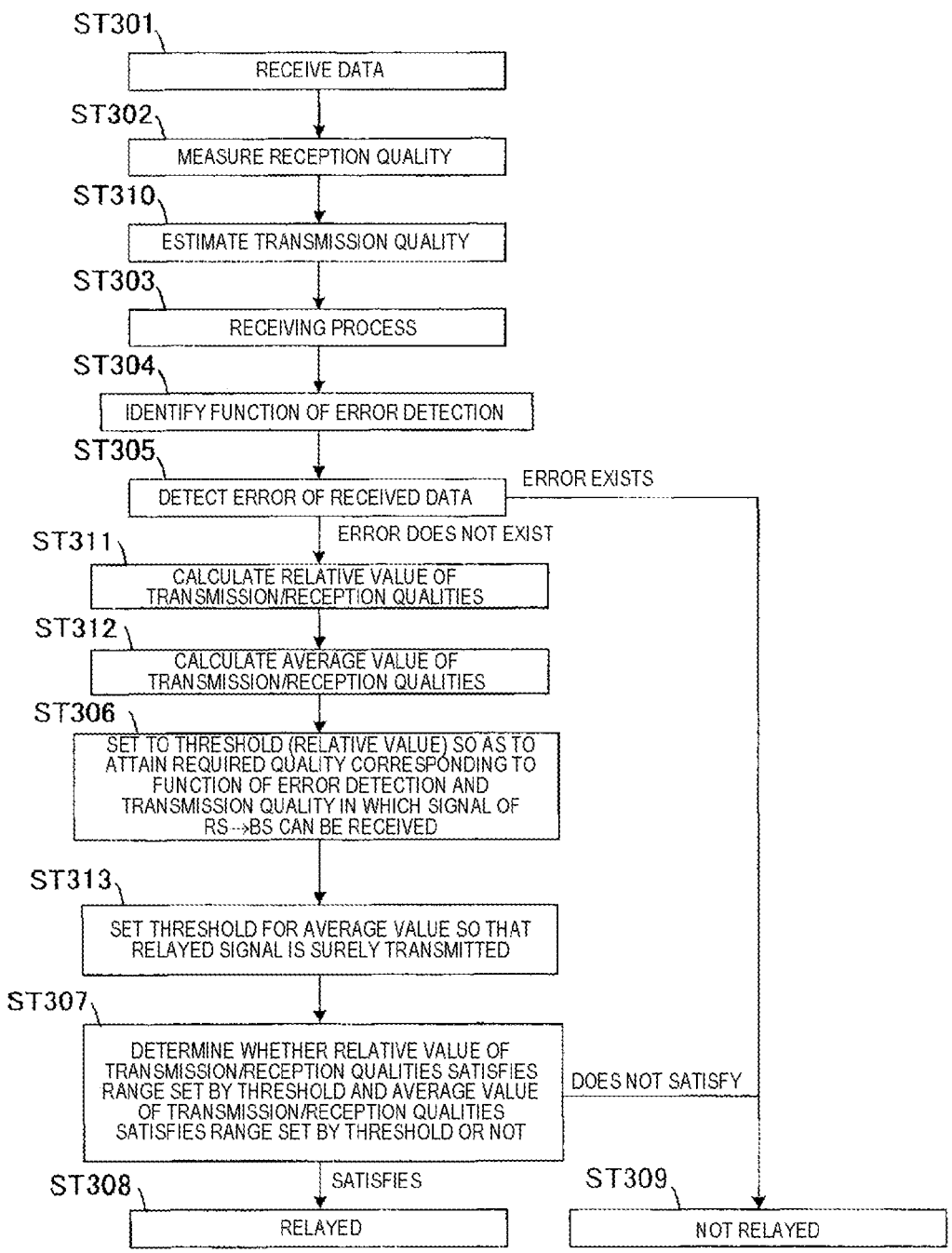
FIG. 15 is a chart showing relay determination process flow 3 in the third embodiment.

As described above, the relay station apparatus 300 according to the third embodiment of the invention performs the process of determining whether the radio signal transmitted from the MS is to be relayed or not, based on relay determination process flow 3 shown in FIG. 15. In the relay station apparatus 300 according to the third embodiment of the invention, the priority of the relaying RS is determined from the above-described relationships shown in FIG. 14 above between the inverse of the average value of the channel qualities and the waiting time T_D of the relayed signal, so that the RSs can select the relaying RS. In the embodiment, therefore, the relay station apparatus 300 in which the possibility of relaying erroneous information is low can be selected in accordance with the function of error detection in the signal to be relayed by the relay station apparatus 300.

Therefore, the relay station apparatus 300 according to the third embodiment of the invention can prevent erroneous information from being relayed, and the frequency use efficiency from being lowered.

In the embodiment of the invention, the case of a single hop in which an RS relays a signal only once has been exemplarily described as a mode in which an RS relays a signal. The invention is not limited to this, and may be applied also to a multi-hop in which a signal is relayed by using a plurality of RSs. In this case, in each relaying state, the previous relaying RS is deemed as the MS, and the RS of the next relay destination is deemed as the relaying RS, thereby enabling the above-described relay method to be applied to a multi-hop.

In the embodiment of the invention, attention is focused on the difference of the function of error detection in the signal relayed by an RS. However, a case where signals having different functions of error detection in one system are relayed, or a case where signals having different functions of error detection are relayed in different systems may be possible. As signals having different functions of error detection in one system, for example, there are data and control information. There is a case where data have a function of error detection in which the undetected error probability is high, but control information has a function of error detection in which the undetected error probability is low, or does not have a function of error detection. As different systems, for example, there is a case where functions of error detection are different from one another according to respective systems.

In the embodiment of the invention, an uplink has been described. A similar process can be applied also to a downlink (a channel from the BS to the MS). In this case, a quality which is measured in the MS by using a signal transmitted from an RS is fed back to the RS, thereby allowing the RS to know the quality of the transmission channel from the RS to the MS.

Fourth Embodiment

Next, a relay station apparatus 400 according to a fourth embodiment of the invention will be described.

In the second embodiment, the method has been described in which a relaying RS is selected by using, for example, the evaluation function indicated by (Exp. 5) or (Exp. 7) so that an RS in which, in the case where the undetected error probability is high, the transmission and reception qualities in the RS are similar in degree is selected as a relaying RS. However, the evaluation function E_RSi indicated by (Exp. 5) or (Exp. 7) may be applied also to the case where the undetected error probability is low. The embodiment will be described taking the evaluation function E_RSi indicated by (Exp. 7) as an example.

Here, similarly with the first to third embodiments, an relaying RS in the embodiment is a relay station apparatus (relay station) which relays a radio signal received from the MS, to the BS.

In the case where both the channel qualities or the channel quality Q_(MS→RSi) from the MS to the RSi and the channel quality Q_(RSi→BS) from the RSi to the BS are high, the evaluation function E_RSi indicated by (Exp. 7) has a high value. In the case where adaptive modulation corresponding to the channel quality is performed in the channel from the MS to the RS and that from the RS to the BS, when the quality of one of the channels is low and only transmission at a low rate can be performed, the channel becomes a bottleneck, and the frequency efficiency is impaired.

By contrast, in the case where both the channel qualities are high, no bottleneck occurs, and the frequency efficiency of the whole two channels is improved. The evaluation function E_RSi indicated by (Exp. 7) is an evaluation function which has a high value when both the channel qualities are high. When the evaluation function E_RSi indicated by (Exp. 7) is used also in the case where the undetected error probability is low, therefore, it is possible to attain the effect that the frequency efficiency is improved.

In the relay station apparatus 400 according to the fourth embodiment of the invention, the process which is identical with the case where the undetected error probability is high in the second embodiment is applied also to a signal in which the undetected error probability is low. In the RSi, the receiving process is performed on the signal received from the MS, and error detection is performed. In the case where the undetected error probability is low, the result of the error detection is reliable. In the case where it is determined that an error does not exist, therefore, it is determined that relaying is to be performed.

Then, the relay waiting time in an RS which is to perform relaying is set in the following manner. First, the channel quality Q_(MS→RSi) from the MS to the RSi is measured, and the channel quality Q_(RSi→BS) from the Si to the BS is estimated. From these channel qualities, the evaluation function E_RSi indicated by (Exp. 7) is calculated. From the relationship between the evaluation function E_RSi and the waiting time T_D indicated by (Exp. 6), the relay waiting times in RSs are calculated. In this way, the relay waiting time in each RS is set.

In the relay station apparatus 400 according to the fourth embodiment of the invention, an RS in which the transmissionRSreception channel qualities are similar in degree performs relaying, thereby suppressing a bottleneck from being occurred. Therefore, the frequency use efficiency can be prevented from being lowered.

Next, the configuration of the relay station apparatus 400 according to the fourth embodiment will be described with reference to FIG. 16.

FIG. 16 is a block diagram showing the configuration of the relay station apparatus 400 according to the fourth embodiment. As shown in FIG. 16, the relay station apparatus 400 according to the fourth embodiment includes an antenna 401, an RF switch 403, a reception RF section 405, a reception channel quality measurement section 407, a reception processing section 409, an error detector 413, a transmission channel quality estimator 419, a relay controller 421, a memory 423, a transmission processing section 425, a transmission RF section 427, and a transmissionRSreception quality evaluator 429.

The reception RF section 405 performs a filtering process, and processes in the RF frequency band such as a frequency conversion to the IF frequency band or the baseband frequency band, on a signal received by the antenna 401.

The reception channel quality measurement section 407 measures the reception quality (channel quality) from the MS to an RS, by using the received signal. As the reception quality, there are the reception power, the CNR, the SNR, the SIR, the SINR, the path loss, and the like. In the reception measurement, data of the received signal, a reference signal configured by a known signal series contained in the received signal, and the like are used.

The reception processing section 409 performs a receiving process on the received signal which has undergone the processes in the RF frequency band in the reception RF section 405. For example, in the case where a process of demodulating the received signal is performed and error correction coding is found to be performed on the received signal, the reception processing section 409 performs a decoding process.

The error detector 413 detects whether an error occurs in the received signal which has undergone the receiving process in the reception processing section. Examples of a method of detecting an error are a CRC and a parity bit.

The transmission channel quality estimator 419 estimates the quality of a channel from the relay station apparatus to a receiver which is not shown (in this case, a base station apparatus), i.e., the quality of the transmission channel as viewed from the relay station apparatus. In the estimation, a method in which the relay station apparatus receives a signal transmitted from the receiver which is not shown, and the estimation is performed, a method in which the receiver which is not shown feeds back a quality measured in the receiver, and the estimation is performed, or the like may be used.

The transmissionRSreception quality evaluator 429 evaluates the quality of the whole transmissionRSreception channels by using the transmission channel quality estimated in the transmission channel quality estimator 419, and the reception channel quality measured in the reception channel quality measurement section 407. For example, the evaluation function E_RSi indicated by (Exp. 7) is used. The evaluated quality of the whole transmissionRSreception channels is output to the relay controller 421.

The relay controller 421 controls the priority of an RS based on the quality of the whole transmissionRSreception channels evaluated in the transmissionRSreception quality evaluator 429, in the case where it is determined in the error detector 413 that an error does not exist.

The memory 423 stores received data on which the receiving process has been performed in the reception processing section 409.

The transmission processing section 425 performs a transmitting process on the received data stored in the memory 423, in accordance with instructions from the relay controller 421. As the transmitting process, there are the error correction coding process, a modifying process, and the like. In the case where there is a function of error detection, a process which is necessary in error detection. For example, there is a process which is necessary in a CRC.

The transmission RF section 427 performs processes in the RF frequency band such as a frequency conversion to the RF frequency band, power amplification, and a filtering process, on a transmitted signal produced in the transmission processing section 425.

The RF switch 403 performs a switching operation so that the signal received by the antenna 401 is connected to the reception RF section 405, and the signal from the transmission RF section is connected to the antenna.

According to the above-describe configuration, in the relay station apparatus 400 according to the fourth embodiment of the invention, an RS in which the transmission and reception qualities are similar in degree is selected as a relaying RS, thereby suppressing a bottleneck from being occurred. Therefore, the frequency use efficiency can be prevented from being lowered.

In the embodiment, the evaluation is performed based on the channel qualities from the MS to the RS and from the RS to the BS which are indices. The invention is not limited to this. The evaluation may be performed based on indices such as the transmission rate and throughput which are obtained in adaptive modulation corresponding to a channel quality.

In the embodiment, similarly with the second embodiment, a single hop is assumed. The invention is not limited to this. A multi-hop environment in which relaying is performed by using a plurality of RSs may be used. In this case, it is required that each RS can receive the downlink channel from the BS and estimate the channel quality from the RS to the BS.

In the embodiment of the invention, an uplink has been described. A similar process can be applied also to a downlink (a channel from the BS to the MS). In this case, a quality which is measured in the MS by using a signal transmitted from an RS is fed back to the RS, thereby allowing the RS to know the quality of the transmission channel from the RS to the MS.

In the description of the embodiments, antennas are adopted, but the embodiments can be similarly applied also to an antenna port. The antenna port refers to a logical antenna configured by one or a plurality of physical antennas. That is, the antenna port does not necessarily refer to one physical antenna, and may refer to an array antenna configured by of a plurality of antennas, or the like. In LTE, for example, the number of physical antennas constituting an antenna port is not particularly defined, and is defined as the minimum unit in which a base station can transmit different Reference signals. The antenna port may be defined as the minimum unit for multiplying weighting of Precoding vector.

Typically, the functional block diagrams which are used in the descriptions of the embodiments are realized in the form of an LSI which is an integrated circuit. They may be individually integrated in one chip, or part or all of them may be integrated in one chip. Although such an integrated circuit is referred to as an LSI, such an integrated circuit may be called an IC, a system LSI, a super LSI, or an ultra LSI depending on the degree of integration.

The method of realizing such an integrated circuit is not limited to an LSI, and the integrated circuit may be realized by a dedicated circuit or a general-purpose processor. Alternatively, it is also possible to use an FPGA (Field Programmable Gate Array) which can be programmed after the production of the LSI, or Re-configurable Processor in which the connections or settings of circuit cells in the LSI can be reconfigured.

Furthermore, with the advancement of semiconductor technologies or other technologies derived therefrom, when integrated circuit technologies which replace LSIs emerge, it is a matter of course that the functional blocks may be integrated using such technologies. The applications of biotechnology, and the like are possible.

Although the invention has been described in detail and with reference to the specific embodiments, it is obvious to those skilled in the art that various changes and modifications can be made without departing from the spirit and scope of the invention.

The application is based on Japanese Patent Application (No. 2009-086971) filed on Mar. 31, 2009, and its disclosure is incorporated herein by reference.

INDUSTRIAL APPLICABILITY

The relay station apparatus of the invention has an effect that wrong information can be prevented from being relayed, and is useful as a relay station apparatus or the like.

REFERENCE SIGNS LIST 100, 200, 300, 400 relay station apparatus
101, 201, 301, 401 antenna
103, 203, 303, 403 RF switch (SW)
105, 205, 305, 405 reception RF section
107, 207, 307, 407 reception channel quality measurement section
109, 209, 309, 409 reception processing section
111, 211, 311 function-of-error-detection identification section
113, 213, 313, 413 error detector
115, 215, 315 quality determination section
117, 217, 317 relay determination section
119, 219, 319, 419 transmission channel quality estimator
121, 221, 321, 421 relay controller
123, 223, 323, 423 memory
125, 225, 325, 425 transmission processing section
127, 227, 327, 427 transmission RF section
229, 329 transmissionRSreception quality relative-value calculator
331 transmissionRSreception quality average-value calculator
429 transmissionRSreception quality evaluator

The invention claimed is:

1. A relay station apparatus which relays a radio signal between a transmission station and a reception station, comprising:
   a receiver which is configured to receive the radio signal from the transmission station;
   a function-of-error-detection identification section which is configured to identify a function of error detection that indicates a capability of a method of error detection in the received radio signal; and
   a relay determination section which is configured, in accordance with the identified function of error detection, to determine whether the signal is to be relayed or not, based on a first channel quality indicating a channel quality from the transmission station to the relay station apparatus.

2. The relay station apparatus according to claim 1, wherein
   the relay determination section is configured, in accordance with the identified function of error detection, to determine whether the signal is to be relayed or not, based on the first channel quality and a second channel quality indicating a channel quality from the relay station apparatus to the reception station.

3. The relay station apparatus according to claim 2, further comprising:
   a quality determination section which is configured, when a undetected error probability in the identified function of error detection, to determine whether the first channel quality satisfies a required quality or not, wherein
   the relay determination section is also configured, if the quality determination section determines that the first channel quality satisfies the required quality, to determine whether the radio signal is to be relayed or not, based on the second channel quality.

4. The relay station apparatus according to claim 2, wherein the relay determination section is configured, in accordance with the identified function of error detection, to determine whether the signal is to be relayed or not, based on a relative value between the first channel quality and the second channel quality.

5. The relay station apparatus according to claim 4, wherein the relay determination section is configured, in accordance with the function of error detection in the identified function of error detection, to determine whether the signal is to be relayed or not, based on the relative value and an absolute value between the first channel quality and the second channel quality.

6. The relay station apparatus according to claim 1, further comprising:
   an error detector which is configured to detect an error of the radio signal received by the receiver, wherein
   the relay determination section is configured, when the undetected error probability in the identified function of error detection is low, to determine whether the radio signal is to be relayed or not, based on a result of the detection by the error detector and the first channel quality.

7. A relay method performed by a relay station apparatus which relays a radio signal between a transmission station and a reception station, the relay method comprising:
   receiving the radio signal from the transmission station;
   identifying a function of error detection that indicates a capability of a method of error detection in the received radio signal; and
   determining, in accordance with the identified function of error detection, whether the signal is to be relayed or not, based on a first channel quality indicating a channel quality from the transmission station to the relay station.

8. A relay station apparatus which relays a radio signal between a transmission station and a reception station, comprising:
   a receiver which is configured to receive the radio signal from the transmission station;
   a function-of-error-detection identification section which is configured to identify a function of error detection that identifies presence or absence of a function of error detection in the received radio signal;

an error detector that detects whether an error occurs in the received signal; and a relay determination section which is configured to determine whether the signal is to be relayed or not based on both a result of identifying the presence or absence of the function of error detection and a result of detecting whether an error occurs in the received signal.

* * * * *